(12) United States Patent
Luo

(10) Patent No.: US 12,024,190 B1
(45) Date of Patent: Jul. 2, 2024

(54) LANE CHANGE ASSISTANCE METHOD AND SYSTEM WITH BLIND-SPOT-DETECTION FOREWARNING FUNCTION

(71) Applicant: Shenzhen Baoshijie Technology Co., Ltd., Shenzhen (CN)

(72) Inventor: Mingcai Luo, Shenzhen (CN)

( * ) Notice: Subject to any disclaimer, the term of this patent is extended or adjusted under 35 U.S.C. 154(b) by 0 days.

(21) Appl. No.: 18/494,665

(22) Filed: Oct. 25, 2023

(51) Int. Cl.
| | |
|---|---|
| *B60W 50/14* | (2020.01) |
| *B60W 30/18* | (2012.01) |
| *B60W 40/105* | (2012.01) |
| *G06T 7/80* | (2017.01) |
| *G06V 20/56* | (2022.01) |
| *G06V 20/58* | (2022.01) |
| *H04W 4/48* | (2018.01) |

(52) U.S. Cl.
CPC ...... *B60W 50/14* (2013.01); *B60W 30/18163* (2013.01); *B60W 40/105* (2013.01); *G06T 7/80* (2017.01); *G06V 20/58* (2022.01); *G06V 20/588* (2022.01); *H04W 4/48* (2018.02); *B60W 2050/143* (2013.01); *B60W 2050/146* (2013.01); *B60W 2420/403* (2013.01); *B60W 2552/53* (2020.02); *G06T 2207/30256* (2013.01)

(58) Field of Classification Search
CPC .......... B60W 50/14; B60W 30/18163; B60W 40/105; B60W 2050/143; B60W 2050/146; B60W 2420/403; B60W 2552/53; G06T 7/80; G06T 2207/30256; G06V 20/58; G06V 20/588; H04W 4/48
USPC ......................................................... 340/438
See application file for complete search history.

(56) References Cited

U.S. PATENT DOCUMENTS

| | | | | |
|---|---|---|---|---|
| 9,280,901 | B2 * | 3/2016 | Chen | G08G 1/167 |
| 11,254,261 | B2 * | 2/2022 | Bennemann | B60Q 1/545 |
| 2014/0071278 | A1 * | 3/2014 | Assaf | B60R 1/12 348/148 |
| 2019/0016338 | A1 * | 1/2019 | Ishioka | B60W 30/18163 |
| 2019/0035280 | A1 * | 1/2019 | Kim | G08G 1/167 |
| 2019/0126927 | A1 * | 5/2019 | Uejima | B60W 50/14 |
| 2022/0055619 | A1 * | 2/2022 | Yang | B60W 30/18163 |
| 2022/0194411 | A1 * | 6/2022 | Lee | B60W 10/20 |

* cited by examiner

*Primary Examiner* — Omar Casillashernandez

(57) ABSTRACT

The present disclosure provides a lane change assistance system for a recreational vehicle. The lane change assistance system for a recreational vehicle includes an image acquisition device and a display device. The image acquisition device is configured to obtain image information around the recreational vehicle and transmit wireless signals through a wireless transmission device. The display device is configured to receive the wireless signals through a wireless receiving device and display the image information. A controller is arranged in the display device. The controller is configured to analyze the image information and output prompt information when there is an abnormal vehicle in a calibrated region.

17 Claims, 14 Drawing Sheets

LANE CHANGE ASSISTANCE METHOD AND SYSTEM WITH BLIND-SPOT-DETECTION FOREWARNING FUNCTION

TECHNICAL FIELD

The present disclosure relates to the technical field of recreational vehicle driving assistance, and particularly, to a lane change assistance system for a recreational vehicle.

BACKGROUND

In a driving process of an automobile, a user often needs to change lanes due to overtaking, obstacle avoidance, or turning at intersections. In a lane change process, it is necessary to enter another lane from one lane, which can easily lead to traffic accidents. Before changing the lane in an automobile, a driver needs to observe road conditions in advance and change the lane at appropriate time. These operations all rely on the rich experience of the user. A recreational vehicle is a large and long automobile. It is difficult to fully learn about driving environments behind and on both sides of the recreational vehicle through rear-view mirrors, and it is even more difficult to change lanes. Users have a strong demand for a lane change assistance device for a recreational vehicle.

At present, the existing lane change assistance devices for a recreational vehicle on the market usually have simple rear-view cameras which help a user learn about the driving environments behind and on both sides of the recreational vehicle, and assists the user in performing a lane change operation on the recreational vehicle. Or, pictures captured by the cameras are analyzed through a computer program to analyze information of vehicles behind and on both sides of the recreational vehicle, so that the user can be prompted to change lanes. This lane change assistance device for the recreational vehicle can only roughly analyze the information of all the vehicles behind and on both sides of the recreational vehicle, and cannot accurately analyze the information of the vehicles in lanes adjacent to both sides of a lane where the recreational vehicle is located. This not only wastes the computing power, but also affects the response speed of a system, so that the user cannot be guided to perform the lane change operation in a timely manner. Moreover, the rough analysis of the information of all the vehicles behind and on both sides of the recreational vehicle can lead to a false alarm, causing the user to miss the opportunity to change the lanes and affecting the lane change operation of the user.

For this purpose, the present disclosure provides a lane change assistance method and system for a recreational vehicle, which can effectively solve the above problems, accurately analyze the information of the vehicles in the lanes adjacent to both sides of the lane where the recreational vehicle is located, and quickly guide the user to perform the lane change operation.

SUMMARY

In order to overcome the shortcomings of the prior art, the present disclosure provides a lane change assistance method and system for a recreational vehicle, which can accurately analyze the information of the vehicles in the lanes adjacent to both sides of the lane where the recreational vehicle is located, and quickly guide the user to perform the lane change operation.

The technical solution adopted by the present disclosure to solve the technical problem is as follows.

The present disclosure provides a lane change assistance system for a recreational vehicle, including:

an image acquisition device, wherein the image acquisition device is configured to obtain image information around the recreational vehicle and transmit wireless signals through a wireless transmission device; and a display device, wherein the display device is configured to receive the wireless signals through a wireless receiving device and display the image information; a controller is arranged in the display device; and the controller is configured to analyze the image information and output prompt information when there is an abnormal vehicle in a calibrated region.

As the improvement of the present disclosure, the calibrated region includes a first calibrated region on a left hand side of the recreational vehicle and a second calibrated region on a right hand side of the recreational vehicle; when the abnormal vehicle exists in the first calibrated region, the controller outputs first prompt information; when the abnormal vehicle exists in the second calibrated region, the controller outputs second prompt information; and the first prompt information is not the same as the second prompt information.

As the improvement of the present disclosure, the first prompt information includes at least one of sound information, image information, and light information; and the second prompt information includes at least one of sound information, image information, and light information.

As the improvement of the present disclosure, the image acquisition device includes at least one camera; the camera is configured to be mounted on an outer wall of the recreational vehicle and is electrically connected to a circuit system inside the recreational vehicle.

As the improvement of the present disclosure, a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°.

As the improvement of the present disclosure, the calibrated region is a partial region in lanes adjacent to both sides of a lane where the recreational vehicle is located.

As the improvement of the present disclosure, the system further includes a first calibration mode; the image information includes lane information; and in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane.

As the improvement of the present disclosure, the system further includes a second calibration mode; the display device allows a user to manually input calibration information; in a case that the calibration in the first calibration mode fails, the controller enters the second calibration mode; and in the second calibration mode, the controller receives the calibration information and determines the calibrated region according to the calibration information.

As the improvement of the present disclosure, the system further includes a third calibration mode; in a case that the calibration in both the first calibration mode and the second calibration mode fails, the controller enters the third calibration mode; and the controller determines a preset region to be the calibrated region.

As the improvement of the present disclosure, the system further includes a positioning device; the positioning device is electrically connected to the controller; the positioning device is configured to obtain position information of the recreational vehicle and transmit the position information to the controller; and the controller calculates a running speed of the recreational vehicle according to the position information and stops outputting prompt information when the running speed is less than a preset speed.

As the improvement of the present disclosure, the system further includes a connector; the connector is electrically connected to the display device; and the connector is configured to be connected to a circuit output end of the recreational vehicle.

As the improvement of the present disclosure, the wireless receiving device is arranged on the connector; or, the wireless receiving device is arranged on the display device.

As the improvement of the present disclosure, the system further includes a transformer; the transformer is arranged between the connector and the display device or the transformer is arranged in the display device; the transformer is electrically connected to the connector and the display device; and the transformer is configured to change a voltage.

As the improvement of the present disclosure, the camera includes a mounting shell and a lens; the mounting shell is configured to be mounted on the outer wall of the recreational vehicle; and the lens is rotatably connected to the mounting shell.

Beneficial effects of the present disclosure are as follows: Due to the arrangement of the above structure, the wireless transmission device transmits the wireless signals, and the display device receives the wireless signals through a wireless structural device and displays the image information. Through the wireless transmission device and the wireless receiving device, wireless transmission of signals can be achieved, and signal transmission between the image acquisition device and the display device can be achieved without a long connecting cable, which greatly facilitates use. The controller can analyze the image information to analyze whether there are abnormal vehicles in the calibrated region, and output the prompt information when there are abnormal vehicles in the calibrated region, so that a user can timely learn about whether there are abnormal vehicles in the calibrated region around the recreational vehicle, and the user can be assisted in a lane change operation. This ensures the driving safety of the user. Preferably, the image acquisition device acquires image information behind the recreational vehicle.

The present disclosure also provides a vehicle-mounted display device of a recreational vehicle, including:

a display device, wherein the display device is configured to receive and display image information acquired by an image acquisition device; a controller is arranged in the display device; and the controller is configured to analyze the image information and output prompt information when there is an abnormal vehicle in a calibrated region.

As the improvement of the present disclosure, the vehicle-mounted display device further includes the image acquisition device and a wireless receiving device; the image acquisition device is configured to obtain image information around the recreational vehicle and transmit wireless signals through a wireless transmitting device; the wireless receiving device receives the wireless signals and outputs the image information to the display device; and a lower portion of the wireless receiving device is provided with a connector; and the connector is configured to be connected to a circuit output end of the recreational vehicle.

As the improvement of the present disclosure, the calibrated region includes a first calibrated region on a left hand side of the recreational vehicle and a second calibrated region on a right hand side of the recreational vehicle; when the abnormal vehicle exists in the first calibrated region, the controller outputs first prompt information; when the abnormal vehicle exists in the second calibrated region, the controller outputs second prompt information; the first prompt information is not the same as the second prompt information.

As the improvement of the present disclosure, the first prompt information includes at least one of sound information, image information, and light information; and the second prompt information includes at least one of sound information, image information, and light information.

As the improvement of the present disclosure, the image acquisition device includes at least one camera; the camera is configured to be mounted on an outer wall of the recreational vehicle and is electrically connected to a circuit system inside the recreational vehicle; a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°.

As the improvement of the present disclosure, the calibrated region is a partial region in lanes adjacent to both sides of a lane where the recreational vehicle is located; the vehicle-mounted display device further includes a first calibration mode, a second calibration mode, and a third calibration mode; the image information includes lane information; in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane; the display device allows a user to manually input calibration information; in a case that the calibration in the first calibration mode fails, the controller enters the second calibration mode; and in the second calibration mode, the controller receives the calibration information and determines the calibrated region according to the calibration information; in a case that the calibration in both the first calibration mode and the second calibration mode fails, the controller enters the third calibration mode; and the controller determines a preset region to be the calibrated region.

As the improvement of the present disclosure, the vehicle-mounted display device further includes a positioning device; the positioning device is electrically connected to the controller; the positioning device is configured to obtain position information of the recreational vehicle and transmit the position information to the controller; and the controller calculates a running speed of the recreational vehicle according to the position information and stops outputting prompt information when the running speed is less than a preset speed.

Beneficial effects of the present disclosure are as follows: Due to the arrangement of the above structure, the display device receives the wireless signals through a wireless structural device and displays the image information. Signal transmission between the image acquisition device and the display device can be achieved without a long connecting cable, which greatly facilitates use. The controller can analyze the image information to analyze whether there are abnormal vehicles in the calibrated region, and output the prompt information when there are abnormal vehicles in the calibrated region, so that a user can timely learn about whether there are abnormal vehicles in the calibrated region of the recreational vehicle, and the user can be assisted in a lane change operation. This ensures the driving safety of the user.

The present disclosure provides also a lane change assistance method for a recreational vehicle, including:

obtaining lane information around the recreational vehicle in a calibrated state, wherein the lane information includes colors of lane markings, dotted or full lane markings, graphic markers, and characters, and the calibrated state includes that the recreational vehicle is running or parked in the middle of a lane;

calibrating a partial region in lanes, adjacent to both sides of a lane where the recreational vehicle is located, as a calibrated region;

obtaining information of a target vehicle around the recreational vehicle in a running state, wherein the information of the target vehicle includes: a longitudinal distance of the target vehicle relative to the recreational vehicle, a longitudinal speed of the target vehicle relative to the recreational vehicle, a longitudinal acceleration of the target vehicle relative to the recreational vehicle, and a longitudinal speed of the target vehicle relative to the ground;

in a running process of the recreational vehicle, determining whether an abnormal target vehicle exists in the calibrated region, and outputting a prompt instruction when a determining result is yes; and outputting prompt information according to the prompt instruction.

As the improvement of the present disclosure, the step of calibrating a partial region in lanes, adjacent to both sides of a lane where the recreational vehicle is located, as a calibrated region includes:

calibrating the partial region in the lanes, adjacent to both sides of the lane where the recreational vehicle is located, as the calibrated region according to the lane information; and detecting whether the calibrated region has been successfully calibrated; and if the calibration fails, calibrating the partial region in the lanes, adjacent to both sides of the lane where the recreational vehicle is located, as the calibrated region according to input information of a user.

As the improvement of the present disclosure, after the step of detecting whether the calibrated region has been successfully calibrated, and if the calibration fails, calibrating the partial region in the lanes, adjacent to both sides of the lane where the recreational vehicle is located, as the calibrated region according to input information of a user, the method further includes:

When a first selection instruction input by the user has been detected, the step of calibrating the partial region in the lanes, adjacent to both sides of the lane where the recreational vehicle is located, as the calibrated region according to input information of a user is executed.

When a second selection instruction input by the user has been detected, the preset region is calibrated to be the calibrated region.

As the improvement of the present disclosure, the step of calibrating the partial region in the lanes, adjacent to both sides of the lane where the recreational vehicle is located, as the calibrated region according to the lane information further includes:

when the recreational vehicle is in a calibrated state, matching a first marking with a centerline of the lane, and matching a second marking with vanishing points of lane lines, wherein the first marking and the second marking form a rectangular coordinate system; and calibrating the partial region in lanes, adjacent to the lane where the recreational vehicle is located, as the calibrated region within the third and fourth quadrants.

As the improvement of the present disclosure, the step of calibrating the partial region in the lanes, adjacent to both sides of the lane where the recreational vehicle is located, as the calibrated region according to input information of a user further includes:

when the recreational vehicle is in a calibrated state, matching a first marking with a centerline of the lane;

calibrating a first calibration point L0 at a position, close to the recreational vehicle, on the left lane line of the lane where the recreational vehicle is located, calibrating the second calibration point L1 at a position, away from the recreational vehicle, on the left lane line of the lane where the recreational vehicle is located, calibrating a third calibration point R0 at a position, close to the recreational vehicle, on the right lane line of the lane where the recreational vehicle is located, calibrating a fourth calibration point R1 at a position, away from the recreational vehicle, on the right lane line of the lane where the recreational vehicle is located, forming a first line segment between the first calibration point L0 and the second calibration point L1, and forming a second line segment between the third calibration point R0 and the fourth calibration point R1; and calibrating the partial region corresponding to the first line segment or the second line segment as the calibrated region in the lanes adjacent to the lane where the recreational vehicle is located.

As the improvement of the present disclosure, the step of calibrating a preset region to be a calibrated region includes:

when the recreational vehicle is in a calibrated state, matching a first marking with a centerline of the lane;

selecting the preset region on both sides of the first marking, and calibrating the preset region to be the calibrated region, wherein a distance between the preset region and the first marking is a first preset distance; the first preset distance is matched with half of a width of the lane; and a width of the preset region is matched with the width of the lane.

As the improvement of the present disclosure, the step of in a running process of the recreational vehicle, determining whether an abnormal target vehicle exists in the calibrated region, and outputting a prompt instruction when a determining result is yes includes: determining whether a target vehicle exists in the calibrated region;

when a target vehicle exists in the calibrated region, determining whether a running direction of the target vehicle is the same as a running direction of the recreational vehicle;

when the running direction of the target vehicle is the same as the running direction of the recreational vehicle, comparing whether the longitudinal distance of the target vehicle relative to the recreational vehicle is less than a preset distance;

when the longitudinal distance of the target vehicle relative to the recreational vehicle is less than the preset distance, determining whether the speed of the target vehicle relative to the recreational vehicle is greater than a preset relative speed;

when the speed of the target vehicle relative to the recreational vehicle is greater than the preset relative speed, determining whether the longitudinal speed of the target vehicle relative to the ground is greater than a preset speed; and when the longitudinal speed of the target vehicle relative to the ground is greater than the preset speed, labeling the target vehicle as an abnormal target vehicle, and outputting the prompt instruction.

As the improvement of the present disclosure, the step of in a running process of the recreational vehicle, determining whether an abnormal target vehicle exists in the calibrated region, and outputting a prompt instruction when a determining result is yes further includes:

if the calibrated region includes a first calibrated region on the left hand side of the recreational vehicle and a second calibrated region on the right hand side of the recreational vehicle, determining that an abnormal target vehicle exists in the first and/or second calibrated region, outputting a first prompt instruction when the abnormal target vehicle exists in the first calibrated region, and outputting a second prompt instruction when the abnormal target vehicle exists in the second calibrated region.

As the improvement of the present disclosure, the step of outputting prompt information according to the prompt instruction includes:

if the prompt information includes first prompt information and second prompt information:

when the first prompt instruction has been received, outputting the first prompt information; and when the second prompt instruction has been received, outputting the second prompt information.

As the improvement of the present disclosure, the first prompt information includes at least one of first sound information and first light information. The second prompt information includes at least one of second sound information and second light information. The first sound information and the second sound information are different.

Beneficial effects of the present disclosure are as follows: by the use of the aforementioned lane change assistance method for the recreational vehicle, firstly, when the recreational vehicle is in the calibrated state, that is, when the recreational vehicle is running or parked in the middle of the lane, the partial region in lanes, adjacent to both sides of the lane where the recreational vehicle is located, is calibrated as the calibrated region; whether an abnormal target vehicle exists in the calibrated region is determined according to the obtained information of the target vehicle around the recreational vehicle, and the prompt instruction is output when the determining result is yes, wherein the information of the target vehicle includes the longitudinal distance of the target vehicle relative to the recreational vehicle, the longitudinal speed of the target vehicle relative to the recreational vehicle, the longitudinal acceleration of the target vehicle relative to the recreational vehicle, and the longitudinal speed of the target vehicle relative to the ground; whether the target vehicle in the calibrated region is an abnormal target vehicle is determined according to the above information; the prompt information is output according to the prompt instruction to prompt a user to not perform a lane change operation; calibration is performed according to the lane information in the calibrated state, and only information of vehicles in the calibrated region is analyzed in the forming process, so that a quantity of target vehicles needing to be analyzed can be reduced; the computing speed is greatly increased, and the computing power consumption is reduced; the prompt information is output timely, so that the user obtains information about lane change timely and is facilitated to perform the lane change operation; furthermore, interference of information of vehicles in other lanes can also be eliminated; and false alarms can be reduced.

In addition, to achieve the above purpose, the present disclosure further provides a computer-readable storage medium. The computer-readable storage medium stores computer-readable instructions. When the computer-readable instructions are executed by a processor, the processor is caused to implement the aforementioned lane change assistance method for the recreational vehicle.

It can be understood that the above computer-readable storage medium implements the aforementioned lane change assistance method for the recreational vehicle when the processor executes the computer-readable instructions, thus achieving the technical effects of the aforementioned lane change assistance method for the recreational vehicle, which will not be described in detail here.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
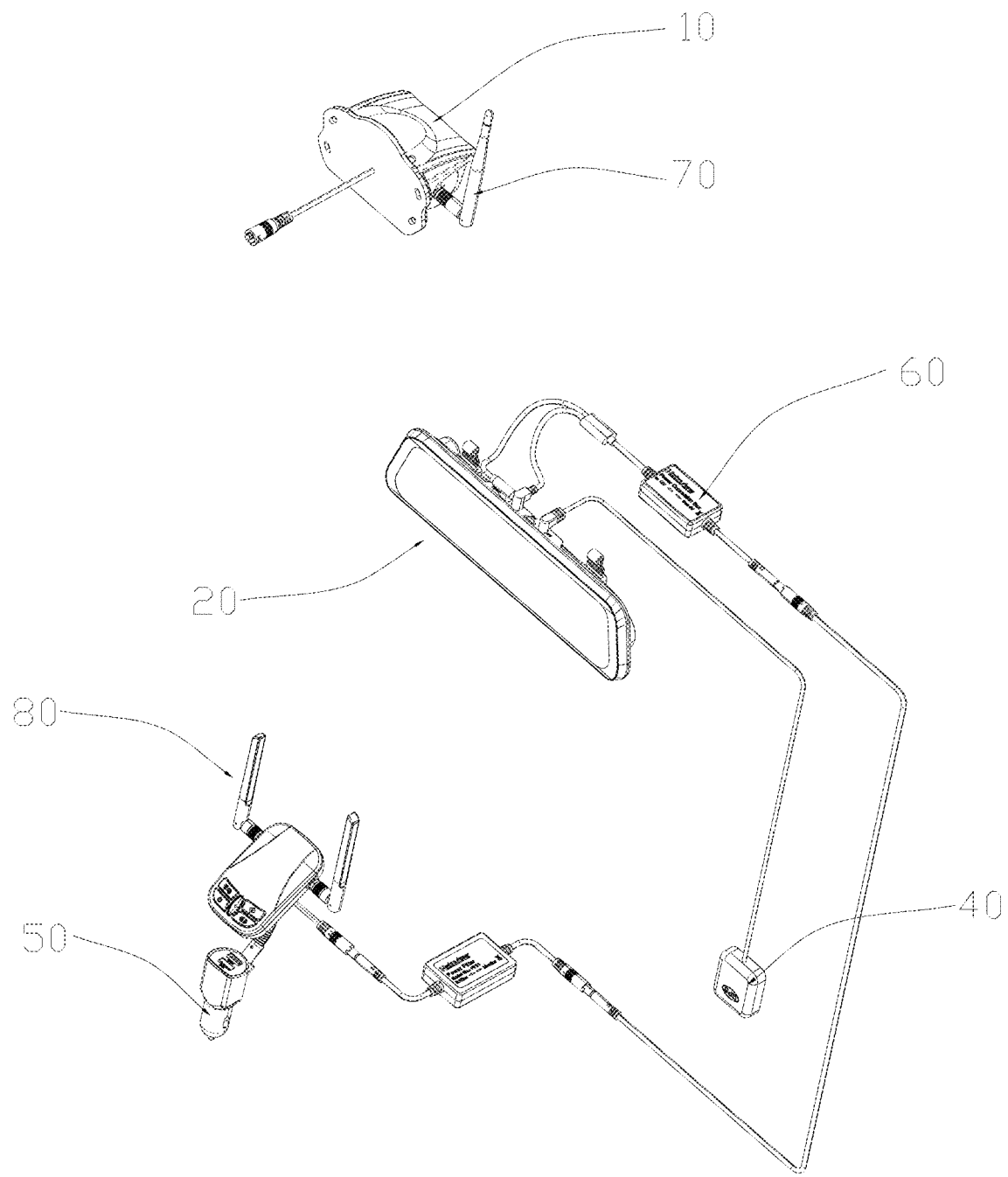
FIG. 1 is a first schematic structural diagram of the present disclosure.
Figure 2:
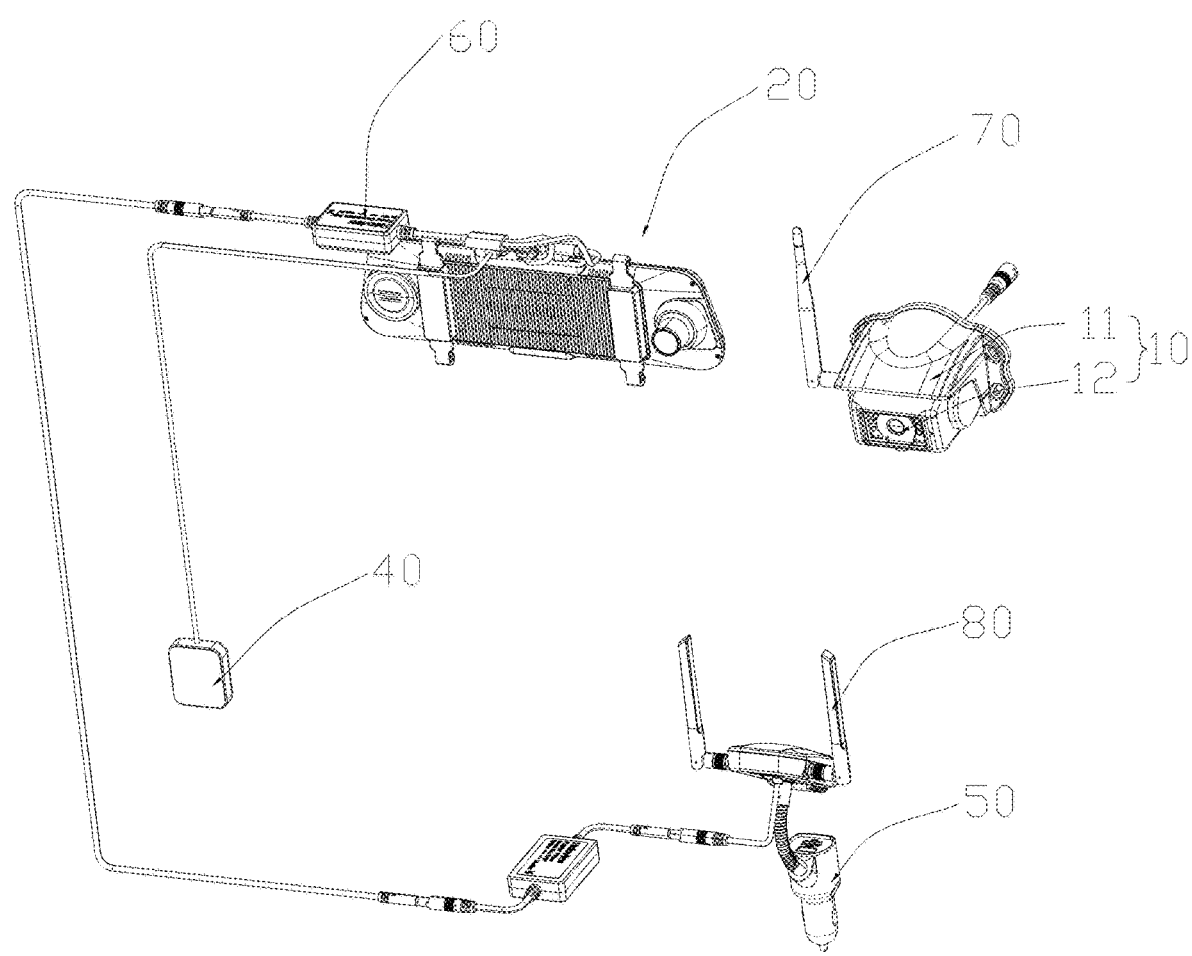
FIG. 2 is a second schematic structural diagram of the present disclosure.
Figure 3:
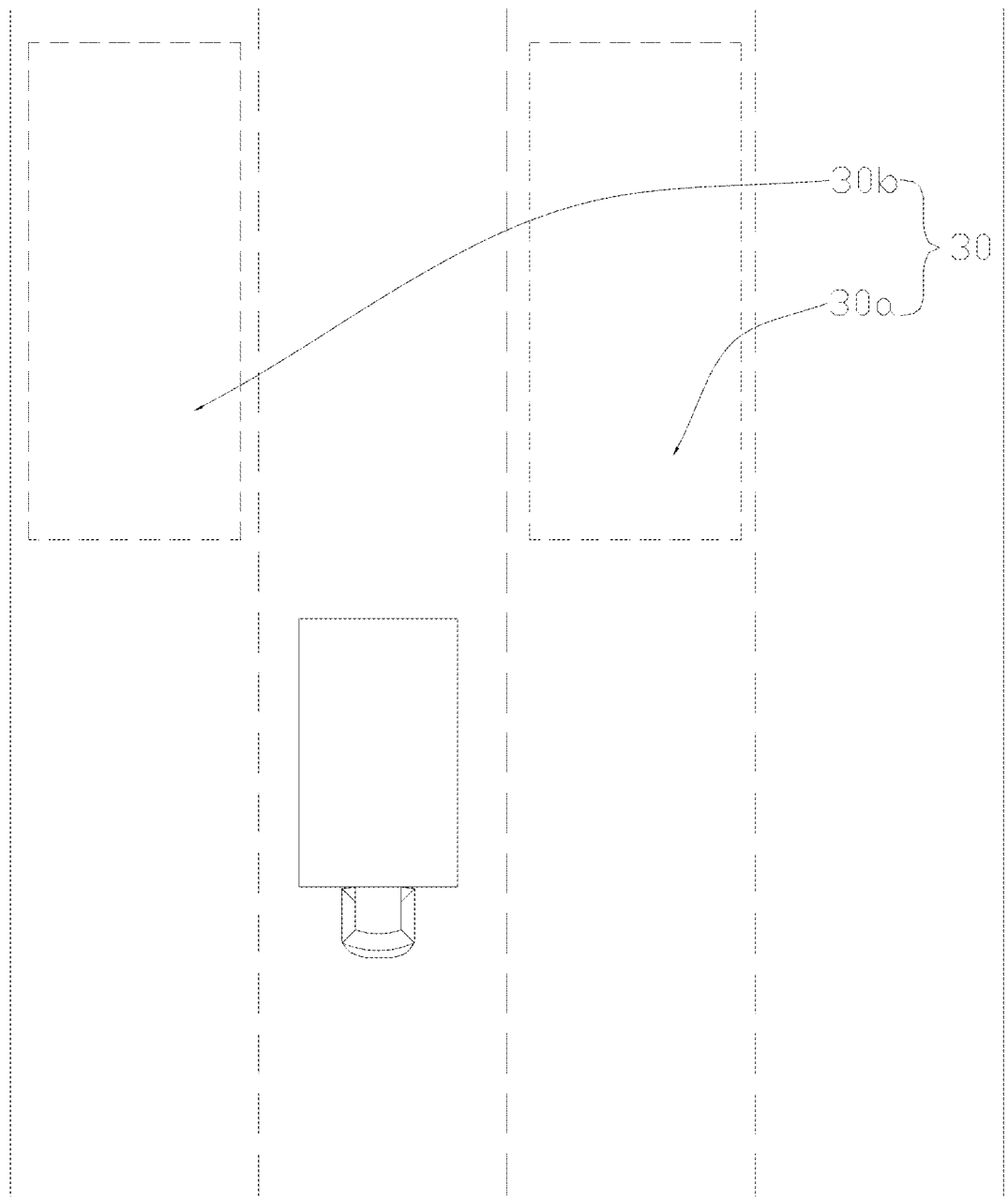
FIG. 3 is a schematic diagram of a calibrated region of the present disclosure.
Figure 4:
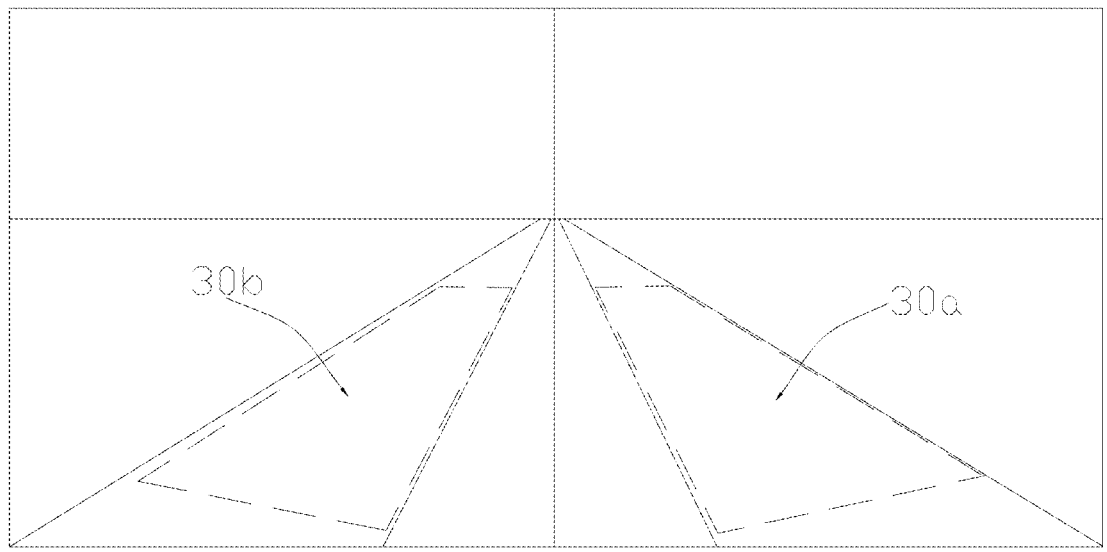
FIG. 4 is a schematic diagram of an image displayed by a display module of the present disclosure.
Figure 5:
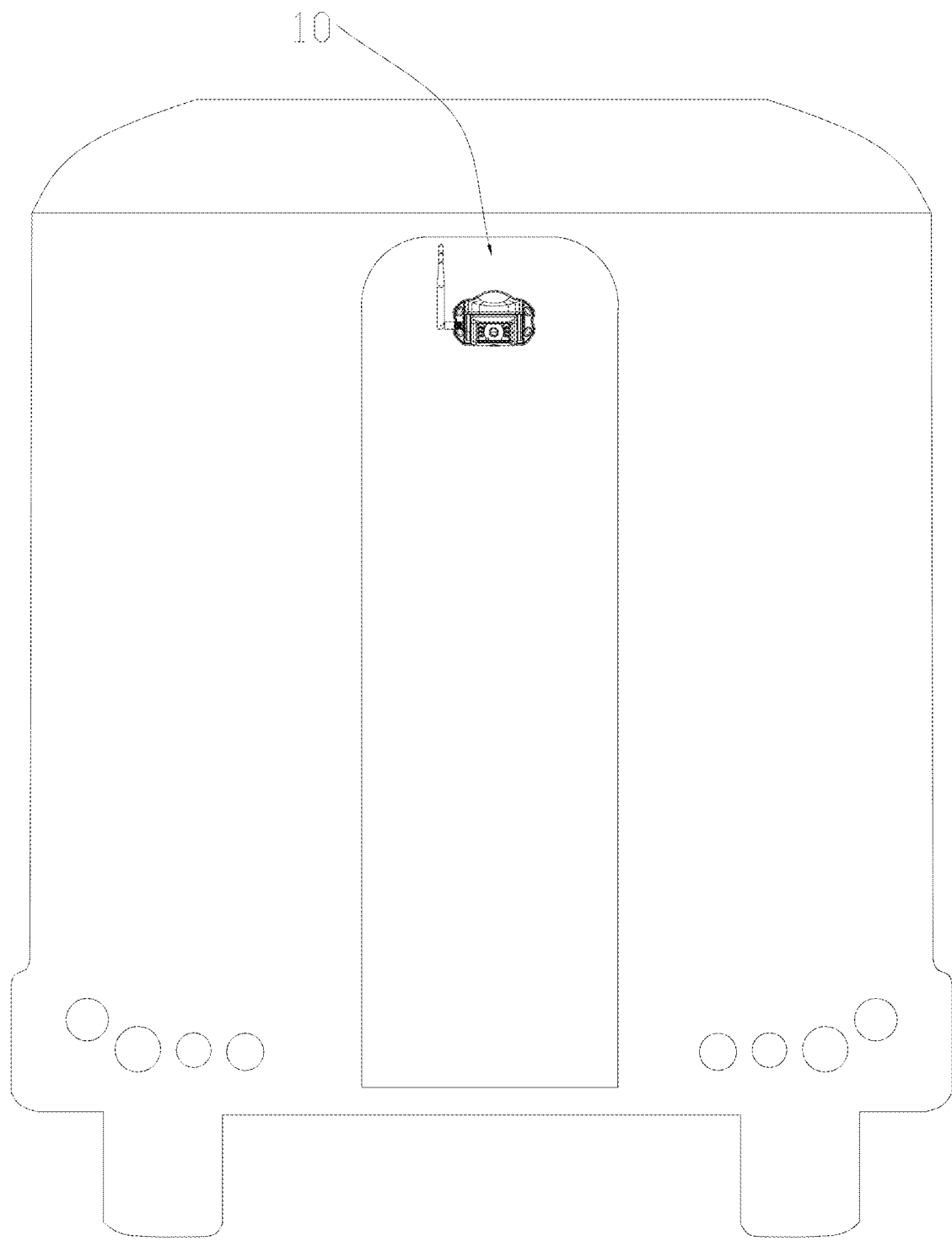
FIG. 5 is a first schematic mounting diagram of a camera module of the present disclosure.
Figure 6:
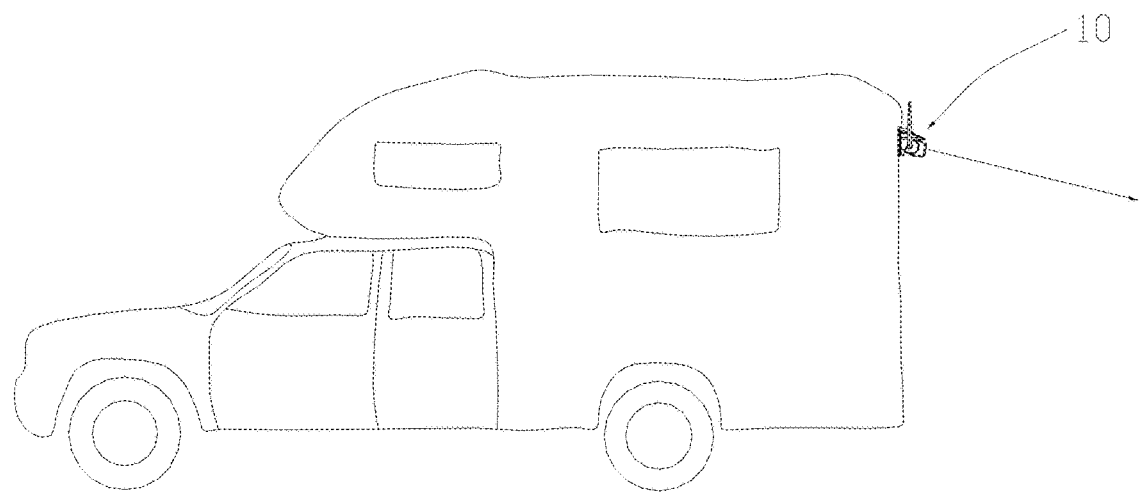
FIG. 6 is a second schematic mounting diagram of a camera module of the present disclosure.
Figure 7:
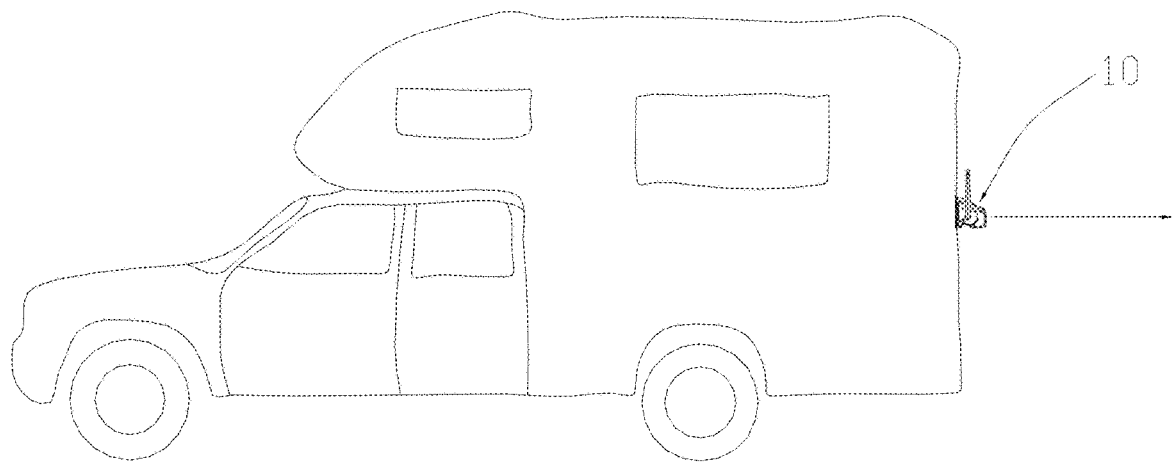
FIG. 7 is a third schematic mounting diagram of a camera module of the present disclosure.
Figure 8A:
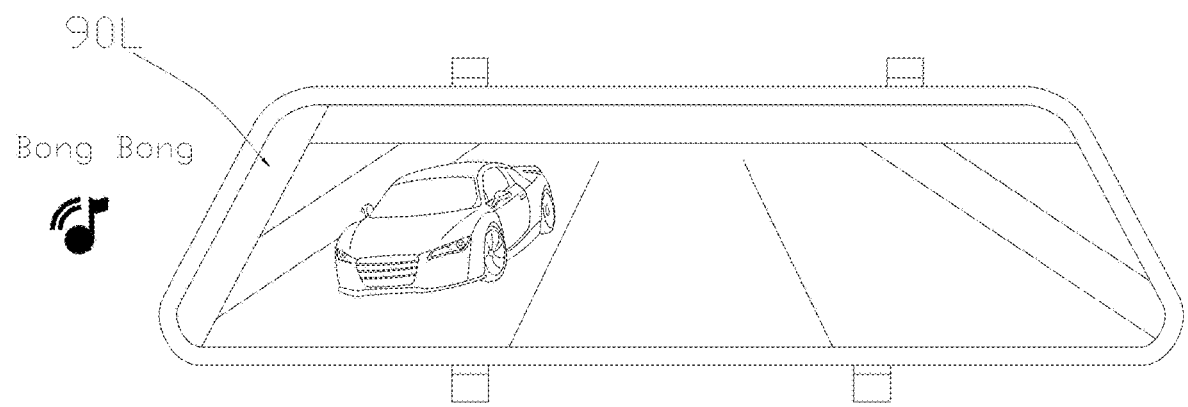
FIG. 8*a* is a schematic diagram of alarming when an abnormal vehicle exists in a first calibrated region of the present disclosure.
Figure 8B:
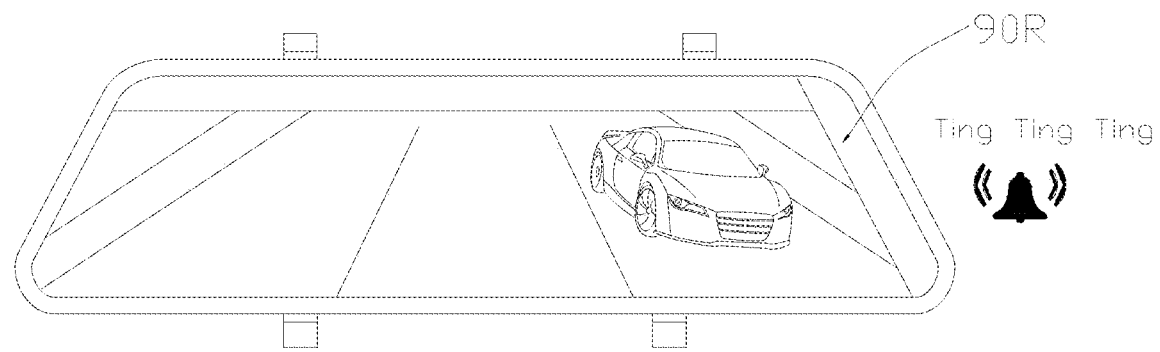
FIG. 8*b* is a schematic diagram of alarming when an abnormal vehicle exists in a second calibrated region of the present disclosure.
Figure 8C:
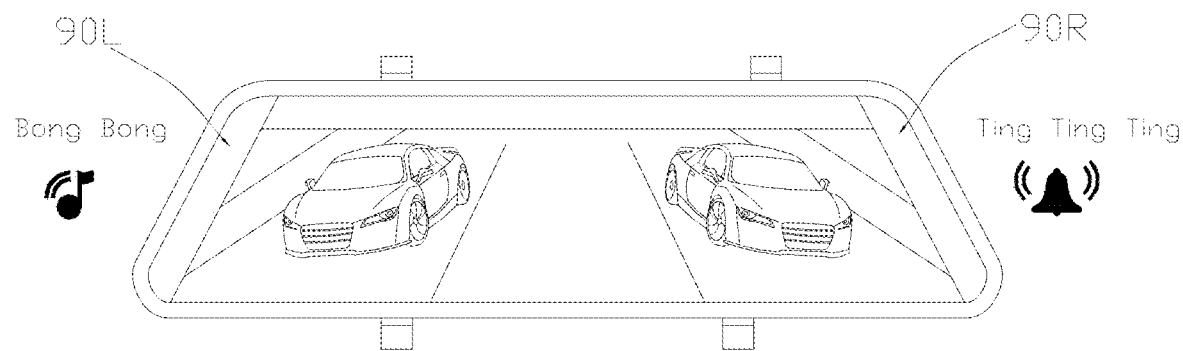
FIG. 8*c* is a schematic diagram of alarming when abnormal vehicles exist in both a first calibrated region and a second calibrated region of the present disclosure.

Referring to FIG. 1 to FIG. 7, the present disclosure provides a lane change assistance system for a recreational vehicle, including:

an image acquisition device 10, wherein the image acquisition device 10 is configured to obtain image information around the recreational vehicle and transmit wireless signals through a wireless transmission device 70; and a display device 20, wherein the display device 20 is configured to receive the wireless signals through a wireless receiving device 80 and display the image information; a controller is arranged in the display device 20; and the controller is configured to analyze the image information and output prompt information when there is an abnormal vehicle in a calibrated region.

Due to the arrangement of the above structure, the wireless transmission device transmits the wireless signals, and the display device receives the wireless signals through a wireless structural device and displays the image information. Through the wireless transmission device and the wireless receiving device, wireless transmission of signals can be achieved, and signal transmission between the image acquisition device and the display device can be achieved without a long connecting cable, which greatly facilitates use. The controller can analyze the image information to analyze whether there are abnormal vehicles in the calibrated region, and output the prompt information when there are abnormal vehicles in the calibrated region, so that a user can timely learn about whether there are abnormal vehicles in the calibrated region around the recreational vehicle, and the user can be assisted in a lane change operation. This ensures the driving safety of the user. Preferably, the image acquisition device acquires image information behind the recreational vehicle.

In this embodiment, the calibrated region includes a first calibrated region 30a on a left hand side of the recreational vehicle and a second calibrated region 30b on a right hand side of the recreational vehicle; when an abnormal vehicle exists in the first calibrated region 30a, the controller outputs first prompt information; when an abnormal vehicle exists in the second calibrated region 30b, the controller outputs second prompt information; and the first prompt information is not the same as the second prompt information. Due to the arrangement of the above structure, during use, when an abnormal vehicle appears in the first calibrated region on the left hand side of the recreational vehicle, the controller outputs the first prompt information to prompt the user that there is an abnormal vehicle on the left hand side of the recreational vehicle, so that the user will temporarily not change the lane to the left or pay more attention when changing the lane to the left. This assists the user in completing a left lane change operation. When an abnormal vehicle appears in the second calibrated region on the right hand side of the recreational vehicle, the controller outputs the second prompt information to prompt the user that there is an abnormal vehicle on the right hand side of the recreational vehicle, so that the user will temporarily not change the lane to the right or pay more attention when changing the lane to the right. This assists the user in completing a right lane change operation. Moreover, the first prompt information and the second prompt information are not the same. The user can determine whether the abnormal vehicle exists on the left hand side or the right hand side by only determining whether the first prompt information or the second prompt information is received, making it easier for the user to make a response in a timely manner. The system is more convenient to use, and the lane change operation is also safer.

In this embodiment, the first prompt information includes at least one of sound information, image information, and light information; and the second prompt information includes at least one of sound information, image information, and light information. Due to the arrangement of the above structure, the first prompt information and the second prompt information may be the sound information. For example, when an abnormal vehicle appears in the first calibrated region on the left hand side of the recreational vehicle, the controller controls a speaker to output first sound information, such as "Bong Bong". When an abnormal vehicle appears in the second calibrated region on the right hand side of the recreational vehicle, the controller controls the speaker to output second sound information, such as "Ting Ting". Similarly, the first prompt information and the second prompt information can also be image information. For example, when an abnormal vehicle appears in the first calibrated region on the left hand side of the recreational vehicle, the controller controls a first prompt region 90L on the display device to flash. When an abnormal vehicle appears in the second calibrated region on the right hand side of the recreational vehicle, the controller controls a second prompt region 90R on the display device to flash. The first prompt information and the second prompt information can also be light information. For example, when an abnormal vehicle appears in the first calibrated region on the left hand side of the recreational vehicle, the controller controls a first indicator lamp located on the left hand side to be lit up. When an abnormal vehicle appears in the second calibrated region on the right hand side of the recreational vehicle, the controller controls a second indicator lamp located on the right hand side to be lit up.

In this embodiment, the image acquisition device 10 includes at least one camera; the camera is configured to be mounted on an outer wall of the recreational vehicle and is electrically connected to a circuit system inside the recreational vehicle. Due to the arrangement of the above structure, the camera is directly connected to the circuit system in the recreational vehicle, which can supply power to the camera, improve the battery life of the product, and facilitate connection. Preferably, the camera is configured to be mounted on the outer wall of a rear portion of the recreational vehicle to obtain image information of the rear portion of the recreational vehicle.

In this embodiment, a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°. Due to the arrangement of the above structure, during use, the camera is mounted on the outer wall of the recreational vehicle at the mounting height of 0.6 m to 1.5 m. In this case, a lens of the camera is oriented around the recreational vehicle. At this mounting height, lanes and vehicles can be exactly captured to obtain the image information. Or, the camera is mounted on the outer wall of the recreational vehicle at the mounting height of 2.3 m to 4 m. The camera is tilted downwards at the tilt angle of 12° to 15°, which is enough to capture an environment around the recreational vehicle and obtain the image information. The user can select different mounting heights according to a need for ease of use.

In this embodiment, the calibrated region is a partial region in lanes adjacent to both sides of a lane where the recreational vehicle is located. Due to the arrangement of the above structure, the calibrated region is used, so that the controller only needs to determine whether there are abnormal vehicles in the lanes adjacent to the left and right sides of the lane where the recreational vehicle is located, which reduces interference from vehicles in other lanes and improves the determining speed of the controller. The controller can quickly output the prompt information to prompt the user in a timely manner, and assist the user in the lane change operation.

In this embodiment, the system further includes a first calibration mode; the image information comprises lane information; and in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane. Due to the arrangement of the above structure, the recreational vehicle is in a calibrated state, that is, the recreational vehicle is running or parked in the middle of the lane. In the first calibration mode, the controller analyzes the lane information and locates, according to the lane information, the calibrated region in the partial region of the lanes adjacent to both sides of the lane where the recreational vehicle is located. The calibrated region can be distinguished from a non-calibrated region, so that the controller only needs to determine the image information in the calibrated region. This improves the reaction speed of the controller, prompts the user in a timely manner, and assists the user in the lane change operation.

Figure 9:
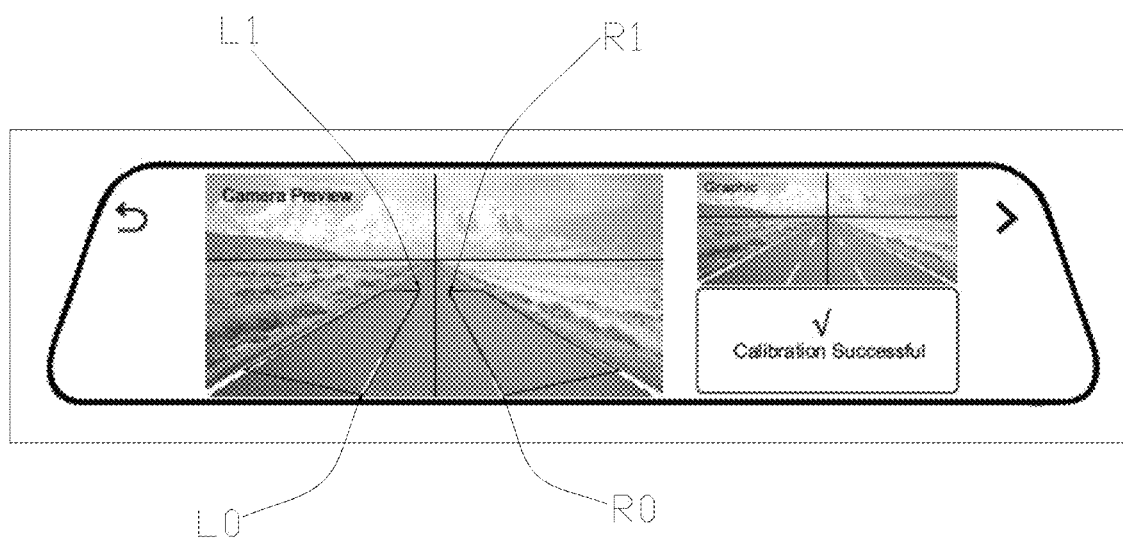
FIG. 9 is a schematic diagram of a second calibration mode of the present disclosure.
Figure 10:
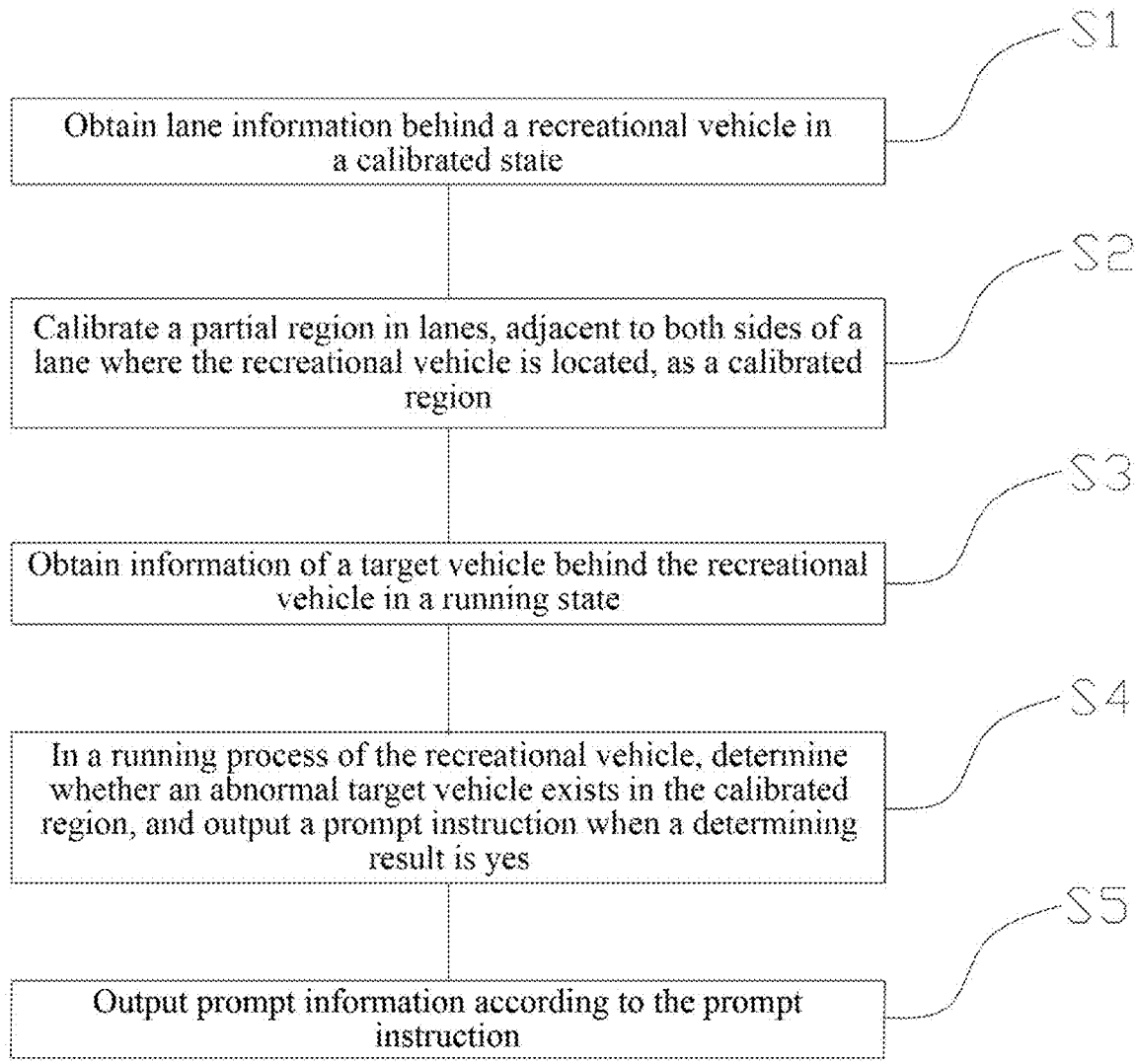
FIG. 10 is a flowchart of a first embodiment of a method of the present disclosure.
Figure 11:
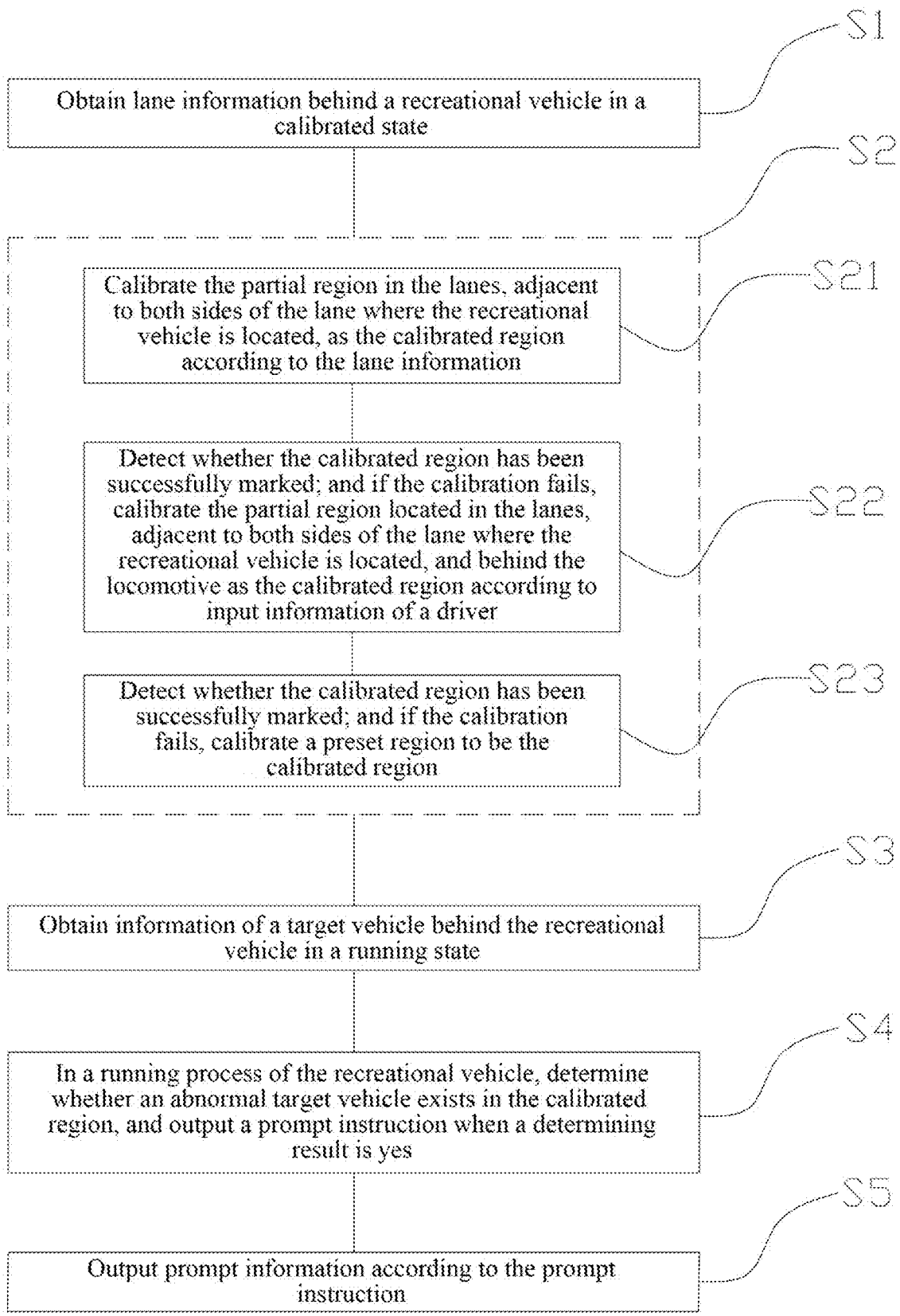
FIG. 11 is a flowchart of a second embodiment of a method of the present disclosure.
Figure 12:
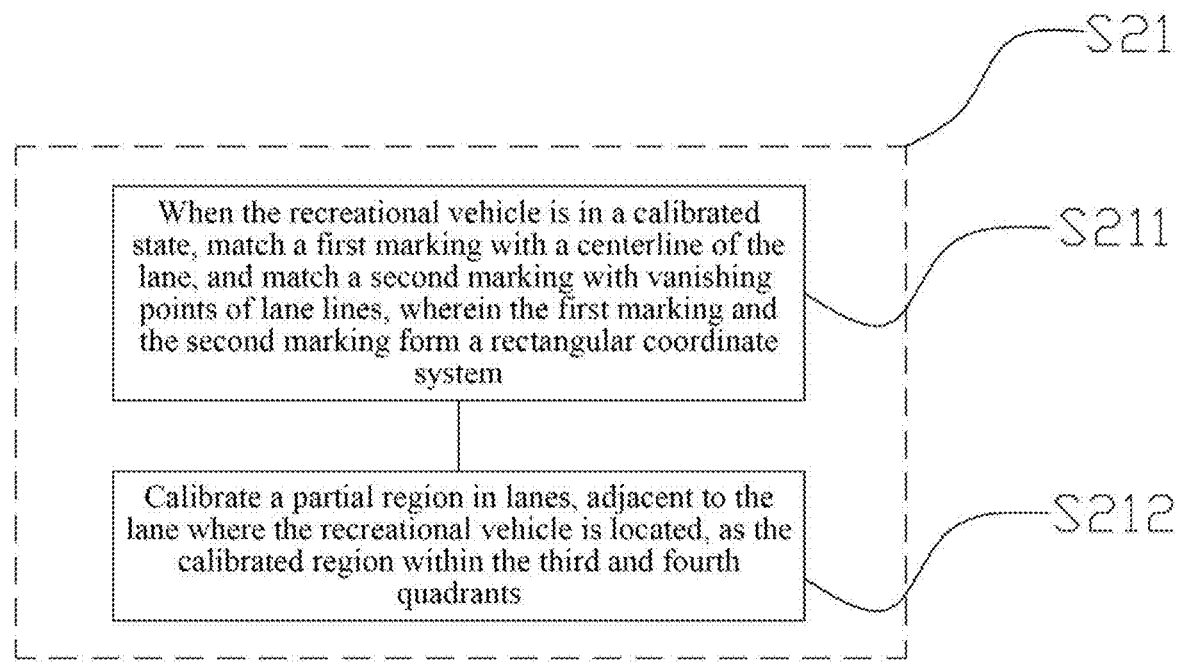
FIG. 12 is a flowchart of step 21 of the method of the present disclosure.
Figure 13:
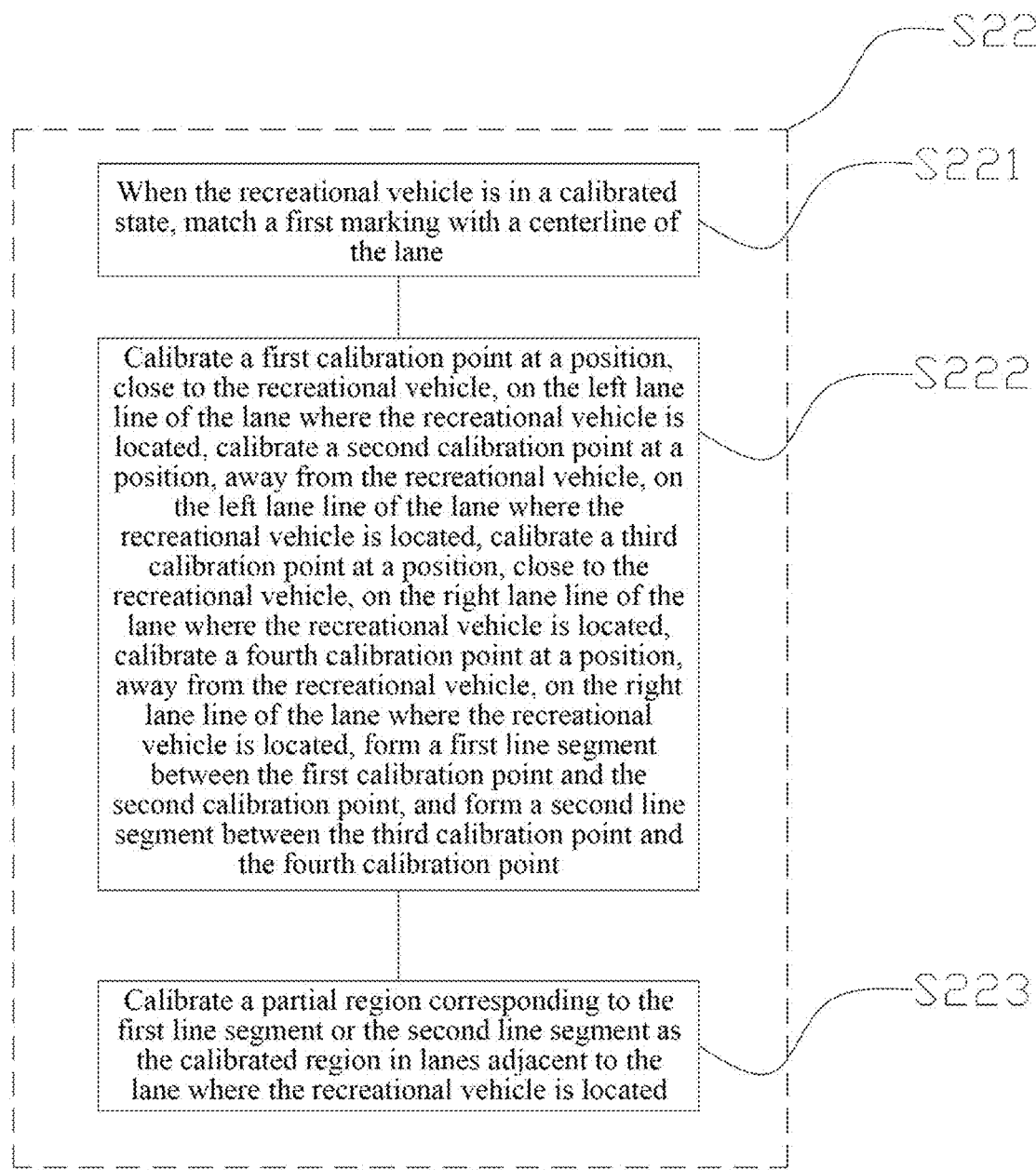
FIG. 13 is a flowchart of step 22 of the method of the present disclosure.
Figure 14:
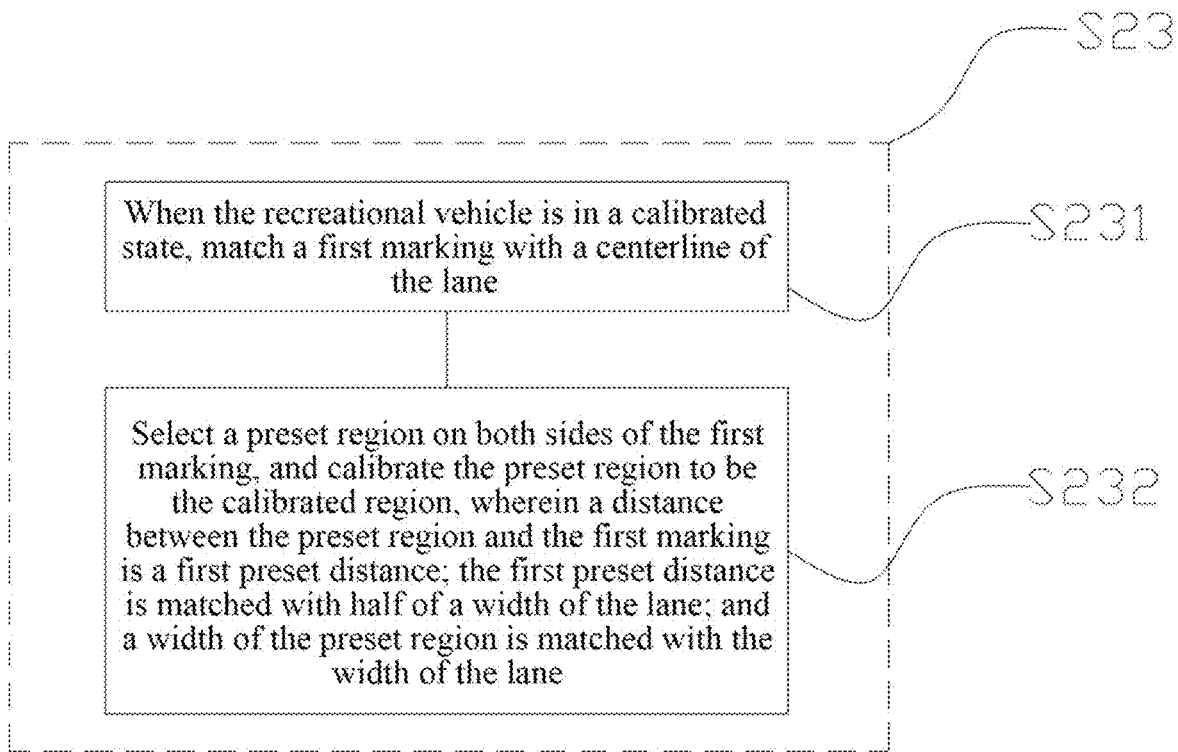
FIG. 14 is a flowchart of step 25 of the method of the present disclosure.

In this embodiment, the system further includes a second calibration mode; the display device 20 allows a user to manually input calibration information; in a case that the calibration in the first calibration mode fails, the controller enters the second calibration mode; and in the second calibration mode, the controller receives the calibration information and determines the calibrated region according to the calibration information. Due to the arrangement of the above structure, during use, the controller first determines whether the calibration in the first calibration mode succeeds. When the calibration in the first calibration mode fails, the second calibration mode is activated. The user can manually input the calibration information to the display device, such as, inputting calibration points. Referring to FIG. 9, the calibrated region is determined according to the calibration points. The controller receives the calibration information input by the user and determines the calibrated region according to the calibration information. It allows the user to manually perform calibration, which can ensure a definite calibrated region. Various calibration manners also make the product more adaptable.

In this embodiment, the system further includes a third calibration mode. In a case that the calibration in both the first calibration mode and the second calibration mode fails, the controller enters the third calibration mode; and the controller determines a preset region to be the calibrated region. Due to the arrangement of the above structure, the controller first determines whether the calibration in both the first calibration mode and the second calibration mode succeeds. When the calibration in the both the first calibration mode and the second calibration mode fails, the controller enters the third calibration mode and directly determines the present region to be the calibrated region, which can ensure a definite calibrated region. Various calibration manners also make the product more adaptable.

In this embodiment, a positioning device 40 is further included. The positioning device 40 is electrically connected to the controller; the positioning device 40 is configured to obtain position information of the recreational vehicle and transmit the position information to the controller; and the controller calculates a running speed of the recreational vehicle according to the position information and stops outputting prompt information when the running speed is less than a preset speed. Due to the arrangement of the above structure, the positioning device can not only achieve satellite positioning and facilitate navigation for the user, but also measure the running speed of the recreational vehicle. When the running speed of the recreational vehicle is less than the preset speed, the controller stops outputting the prompt information. For example, when the running speed of the recreational vehicle is less than 30 km/h or 50 km/h, the recreational vehicle is in a parked or low-speed running state. In this case, it is relatively safe to change lanes. Stopping outputting the prompt information can avoid the product from continuously outputting the prompt information and improve the user experience.

In this embodiment, the system further includes a connector 50. The connector 50 is electrically connected to the display device 20; and the connector 50 is configured to be connected to a circuit output end of the recreational vehicle. Due to the arrangement of the above structure, the connector can be used to achieve the electrical connection between the display device and the circuit output end of the recreational vehicle, which is simple and convenient.

In this embodiment, the wireless receiving device 80 is arranged on the connector 50; or, the wireless receiving device 80 is arranged on the display device 20. Due to the arrangement of the above structure, the wireless receiving device is arranged on the connector or the display device, which can achieve receiving of the wireless signals and facilitates the data transmission between the image acquisition device and the display device.

In this embodiment, the system further includes a transformer 60. The transformer 60 is arranged between the connector 50 and the display device 20 or the transformer 60 is arranged in the display device 20; the transformer 60 is electrically connected to the connector 50 and the display device 20; and the transformer 60 is configured to change a voltage. Due to the arrangement of the above structure, the transformer can adjust the voltage to continuously maintain the display device at a working voltage, thus prolonging the service life of the product.

In this embodiment, the camera includes a mounting shell 11 and a lens 12; the mounting shell 11 is configured to be mounted on the outer wall of the recreational vehicle; and the lens 12 is rotatably connected to the mounting shell 11. Due to the arrangement of the above structure, during use, the user can adjust an angle between the lens and the mounting shell according to the mounting height of the camera, so that the lens can stably obtain the image information around the recreational vehicle, which improves the adaptability of the product and makes the product used more conveniently.

Referring to FIG. 1 to FIG. 7, the present disclosure provides a vehicle-mounted display device of a recreational vehicle, including:

a display device 20, wherein the display device 20 is configured to receive and display image information acquired by an image acquisition device 10; a controller is arranged in the display device 20; and the controller is configured to analyze the image information and output prompt information when there is an abnormal vehicle in a calibrated region.

Due to the arrangement of the above structure, the display device receives the wireless signals through a wireless structural device and displays the image information. Signal transmission between the image acquisition device and the display device can be achieved without a long connecting cable, which greatly facilitates use. The controller can analyze the image information to analyze whether there are abnormal vehicles in the calibrated region, and output the prompt information when there are abnormal vehicles in the calibrated region, so that a user can timely learn about whether there are abnormal vehicles in the calibrated region of the recreational vehicle, and the user can be assisted in a lane change operation. This ensures the driving safety of the user.

In this embodiment, the vehicle-mounted display device further includes the image acquisition device 10 and a wireless receiving device 80; the image acquisition device 10 is configured to obtain image information around the recreational vehicle and transmit wireless signals through a wireless transmitting device 70; the wireless receiving device 80 receives the wireless signals and outputs the image information to the display device 20; and a lower portion of the wireless receiving device is provided with a connector 50; and the connector 50 is configured to be connected to a circuit output end of the recreational vehicle.

In this embodiment, the calibrated region 30 includes a first calibrated region 30a on a left hand side of the recreational vehicle and a second calibrated region 30b on a right hand side of the recreational vehicle; when an abnormal vehicle exists in the first calibrated region 30a, the controller outputs first prompt information; when an abnormal vehicle exists in the second calibrated region 30b, the controller outputs second prompt information; and the first prompt information is not the same as the second prompt information. Due to the arrangement of the above structure, during use, when an abnormal vehicle appears in the first calibrated region on the left hand side of the recreational vehicle, the controller outputs the first prompt information to prompt the user that there is an abnormal vehicle on the left hand side of the recreational vehicle, so that the user will temporarily not change the lane to the left or pay more attention when changing the lane to the left. This assists the user in completing a left lane change operation. When an abnormal vehicle appears in the second calibrated region on the right hand side of the recreational vehicle, the controller outputs the second prompt information to prompt the user that there is an abnormal vehicle on the right hand side of the recreational vehicle, so that the user will temporarily not change the lane to the right or pay more attention when changing the lane to the right. This assists the user in completing a right lane change operation. Moreover, the first prompt information and the second prompt information are not the same. The user can determine whether the abnormal vehicle exists on the left hand side or the right hand side by only determining whether the first prompt information or the second prompt information is received, making it easier for the user to make a response in a timely manner. The system is more convenient to use, and the lane change operation is also safer.

In this embodiment, the first prompt information includes at least one of sound information, image information, and light information; and the second prompt information includes at least one of sound information, image information, and light information. Due to the arrangement of the above structure, the first prompt information and the second prompt information may be the sound information. For example, when an abnormal vehicle appears in the first calibrated region on the left hand side of the recreational vehicle, the controller controls a speaker to output first sound information, such as "Bong Bong". When an abnormal vehicle appears in the second calibrated region on the right hand side of the recreational vehicle, the controller controls the speaker to output second sound information, such as "Ting Ting". Similarly, the first prompt information and the second prompt information can also be image information. For example, when an abnormal vehicle appears in the first calibrated region on the left hand side of the recreational vehicle, the controller controls the first calibrated region on the display device to flash. When an abnormal vehicle appears in the second calibrated region on the right hand side of the recreational vehicle, the controller controls the second calibrated region on the display device to flash. The first prompt information and the second prompt information can also be light information. For example, when an abnormal vehicle appears in the first calibrated region on the left hand side of the recreational vehicle, the controller controls a first indicator lamp located on the left hand side to be lit up. When an abnormal vehicle appears in the second calibrated region on the right hand side of the recreational vehicle, the controller controls a second indicator lamp located on the right hand side to be lit up.

In this embodiment, the image acquisition device 10 includes at least one camera; the camera is configured to be mounted on an outer wall of the recreational vehicle and is electrically connected to a circuit system inside the recreational vehicle; a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°. Due to the arrangement of the above structure, during use, the camera is mounted on the outer wall of the recreational vehicle at the mounting height of 0.6 m to 1.5 m. In this case, a lens of the camera is oriented around the recreational vehicle. At this mounting height, lanes and vehicles can be exactly captured to obtain the image information. Or, the camera is mounted on the outer wall of the recreational vehicle at the mounting height of 2.3 m to 4 m. The camera is tilted downwards at the tilt angle of 12° to 15°, which is enough to capture an environment around the recreational vehicle and obtain the image information. The user can select different mounting heights according to a need for case of use.

In this embodiment, the calibrated region is a partial region in lanes adjacent to both sides of a lane where the recreational vehicle is located; the vehicle-mounted display device further comprises a first calibration mode, a second calibration mode, and a third calibration mode; the image information comprises lane information; in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane; the display device 20 allows a user to manually input calibration information; in a case that the calibration in the first calibration mode fails, the controller enters the second calibration mode; and in the second calibration mode, the controller receives the calibration information and determines the calibrated region according to the calibration information; in a case that the calibration in both the first calibration mode and the second calibration mode fails, the controller enters the third calibration mode; and the controller determines a preset region to be the calibrated region. Due to the arrangement of the above structure, the calibrated region is used, so that the controller only needs to determine whether there are abnormal vehicles in the lanes adjacent to the left and right sides of the lane where the recreational vehicle is located, which reduces interference from vehicles in other lanes and improves the determining speed of the controller. The controller can quickly output the prompt information to prompt the user in a timely manner and assist the user in the lane change operation. The recreational vehicle is in a calibrated state, that is, the recreational vehicle is running or parked in the middle of the lane. In the first calibration mode, the controller analyzes the lane information and locates, according to the lane information, the calibrated region in the partial region of the lanes adjacent to both sides of the lane where the recreational vehicle is located. The controller determines whether the calibration in the first calibration mode succeeds. When the calibration in the first calibration mode fails, the second calibration mode is activated. The user can manually input the calibration information to the display device, such as, inputting calibration points. Referring to FIG. 9, the calibrated region is determined according to the calibration points. The controller receives the calibration information input by the user and determines the calibrated region according to the calibration information. The controller first determines whether the calibration in both the first calibration mode and the second calibration mode succeeds. When the calibration in the both the first calibration mode and the second calibration mode fails, the controller enters the third calibration mode and directly determines the present region to be the calibrated region, which can ensure a definite calibrated region. Various calibration manners also make the product more adaptable. The three different calibration modes are used, which can ensure the definite calibrated region. Various calibration manners also make the product more adaptable. The calibrated region can be distinguished from a non-calibrated region, so that the controller only needs to determine the image information in the calibrated region. This improves the reaction speed of the controller, prompts the user in a timely manner, and assists the user in the lane change operation.

In this embodiment, a positioning device 40 is further included. The positioning device 40 is electrically connected to the controller; the positioning device 40 is configured to obtain position information of the recreational vehicle and transmit the position information to the controller; and the controller calculates a running speed of the recreational vehicle according to the position information and stops outputting prompt information when the running speed is less than a preset speed. Due to the arrangement of the above structure, the positioning device can not only achieve satellite positioning and facilitate navigation for the user, but also measure the running speed of the recreational vehicle. When the running speed of the recreational vehicle is less than the preset speed, the controller stops outputting the prompt information. For example, when the running speed of the recreational vehicle is less than 30 km/h or 50 km/h, the recreational vehicle is in a parked or low-speed running state. In this case, it is relatively safe to change lanes. Stopping outputting the prompt information can avoid the product from continuously outputting the prompt information and improve the user experience.

Referring to FIG. 8 to FIG. 14, the present disclosure provides a lane change assistance method for a recreational vehicle, including:

S1, obtaining lane information around the recreational vehicle in a calibrated state, wherein the lane information includes colors of lane markings, dotted or full lane markings, graphic markers, and characters, and the calibrated state includes that the recreational vehicle is running or parked in the middle of a lane;

S2, calibrating a partial region in lanes, adjacent to both sides of a lane where the recreational vehicle is located, as a calibrated region;

S3, obtaining information of a target vehicle around the recreational vehicle in a running state, wherein the information of the target vehicle includes: a longitudinal distance of the target vehicle relative to the recreational vehicle, a longitudinal speed of the target vehicle relative to the recreational vehicle, a longitudinal acceleration of the target vehicle relative to the recreational vehicle, and a longitudinal speed of the target vehicle relative to the ground;

S4, in a running process of the recreational vehicle, determining whether an abnormal target vehicle exists in the calibrated region, and outputting a prompt instruction when a determining result is yes; and S5, outputting prompt information according to the prompt instruction.

Due to the arrangement of the above structure, by the use of the aforementioned lane change assistance method for the recreational vehicle, firstly, when the recreational vehicle is in the calibrated state, that is, when the recreational vehicle is running or parked in the middle of the lane, the partial region in lanes, adjacent to both sides of the lane where the recreational vehicle is located, is calibrated as the calibrated region; whether an abnormal target vehicle exists in the calibrated region is determined according to the obtained information of the target vehicle around the recreational vehicle, and the prompt instruction is output when the determining result is yes, wherein the information of the target vehicle includes the longitudinal distance of the target vehicle relative to the recreational vehicle, the longitudinal speed of the target vehicle relative to the recreational vehicle, the longitudinal acceleration of the target vehicle relative to the recreational vehicle, and the longitudinal speed of the target vehicle relative to the ground; whether the target vehicle in the calibrated region is an abnormal target vehicle is determined according to the above information; the prompt information is output according to the prompt instruction to prompt a user to not perform a lane change operation; calibration is performed according to the lane information in the calibrated state, and only information of vehicles in the calibrated region is analyzed in the forming process, so that a quantity of target vehicles needing to be analyzed can be reduced; the computing speed is greatly increased, and the computing power consumption is reduced; the prompt information is output timely, so that the user obtains information about lane change timely and is facilitated to perform the lane change operation; furthermore, interference of information of vehicles in other lanes can also be eliminated; and false alarms can be reduced.

In this embodiment, the step of calibrating a partial region in lanes, adjacent to both sides of a lane where the recreational vehicle is located, as a calibrated region includes:

S21, calibrating the partial region in the lanes, adjacent to both sides of the lane where the recreational vehicle is located, as the calibrated region according to the lane information; and S22, detecting whether the calibrated region has been successfully calibrated; and if the calibration fails, calibrating the partial region in the lanes, adjacent to both sides of the lane where the recreational vehicle is located, as the calibrated region according to input information of a user.

When it is not possible to automatically calibrate the calibrated region according to the lane information, the user is also allowed to perform manual calibration. The user can manually input information for calibration according to the obtained lane information, so as to determine the calibrated region, which prevents a failure of the automatic calibration of the calibrated region and the influence on the lane change operation of the user.

In this embodiment, after the step of detecting whether the calibrated region has been successfully calibrated, and if the calibration fails, calibrating the partial region in the lanes, adjacent to both sides of the lane where the recreational vehicle is located, as the calibrated region according to input information of a user, the method further includes:

S23, detecting whether the calibrated region has been successfully calibrated; and if the calibration fails, detecting a selection instruction input by the user; and S24, detecting whether the calibrated region has been successfully calibrated; and if the calibration fails, calibrating a preset region to be the calibrated region.

When the manual calibration of the user fails, different calibration methods can be performed according to a selection instruction input by the user. When the user inputs the first selection instruction, the manual calibration method is performed again: calibration is performed according to the information manually input by the user to determine the calibrated region. When the user inputs the second selection instruction, the preset region is calibrated to be the calibrated region. The preset region is generally a partial region in the lanes adjacent to the lane where the recreational vehicle is located.

In this embodiment, the step of calibrating the partial region in the lanes, adjacent to both sides of the lane where the recreational vehicle is located, as the calibrated region according to the lane information further includes:

S211, when the recreational vehicle is in a calibrated state, matching a first marking with a centerline of the lane, and matching a second marking with vanishing points of lane lines, wherein the first marking and the second marking form a rectangular coordinate system; and S212, calibrating the partial region in lanes, adjacent to the lane where the recreational vehicle is located, as the calibrated region within the third and fourth quadrants.

When the recreational vehicle is in the calibrated state, that is, when the recreational vehicle is running or parked in the middle of the lane, the first marking is matched with the centerline of the lane and basically overlaps the centerline of the lane. The first marking is generally a centerline in a width direction of the recreational vehicle. The vanishing points of the lane lines of the lane where the recreational vehicle is located is obtained according to the lane information, and the vanishing points of the two lane lines of the lane are used to form the second marking. The first marking and the second marking form the rectangular coordinate system. The partial region in the lanes, adjacent to the lane where the recreational vehicle is located, is calibrated as the calibrated region within the third and fourth quadrants. The above method can be used to effectively calibrate the calibrated region and distinguish it from other regions. When the recreational vehicle is in a running state, only the information of the vehicles in the calibrated region is detected to determine whether the abnormal target vehicle exists, so that fast response is achieved, and the user is guided to perform the lane change operation.

In this embodiment, the step of calibrating the partial region in the lanes, adjacent to both sides of the lane where the recreational vehicle is located, as the calibrated region according to input information of a user further includes:

S221, when the recreational vehicle is in a calibrated state, matching a first marking with a centerline of the lane;

S222, calibrating a first calibration point L0 at a position, close to the recreational vehicle, on the left lane line of the lane where the recreational vehicle is located, calibrating the second calibration point L1 at a position, away from the recreational vehicle, on the left lane line of the lane where the recreational vehicle is located, calibrating a third calibration point R0 at a position, close to the recreational vehicle, on the right lane line of the lane where the recreational vehicle is located, calibrating a fourth calibration point R1 at a position, away from the recreational vehicle, on the right lane line of the lane where the recreational vehicle is located, forming a first line segment between the first calibration point L0 and the second calibration point L1, and forming a second line segment between the third calibration point R0 and the fourth calibration point R1; and S223, calibrating the partial region corresponding to the first line segment or the second line segment as the calibrated region in the lanes adjacent to the lane where the recreational vehicle is located.

When the recreational vehicle is in the calibrated state, that is, when the recreational vehicle is running or parked in the middle of the lane, the first marking is matched with the centerline of the lane and basically overlaps the centerline of the lane. The first marking is generally a centerline in a width direction of the recreational vehicle. The user selects the calibration points on the left and right lane lines of the lane where the recreational vehicle is located, and forms the first line segment between the first calibration point L0 and the second calibration point L1 and the second line segment between the third calibration point R0 and the fourth calibration point R1. The part, corresponding to the first line segment or the second line segment, in the lanes adjacent to the lane where the recreational vehicle is located is calibrated as the calibrated region. By use of the above method, the user can manually input the information according to the lane information and calibrate the calibrated region to distinguish the calibrated region from other regions. When the recreational vehicle is in a running state, only the information of the vehicles in the calibrated region is detected to determine whether the abnormal target vehicle exists, so that fast response is achieved, and the user is guided to perform the lane change operation.

In this embodiment, the step of calibrating a preset region to be a calibrated region includes:

S231, when the recreational vehicle is in a calibrated state, matching a first marking with a centerline of the lane;

S232, selecting the preset region on both sides of the first marking, and calibrating the preset region to be the calibrated region, wherein a distance between the preset region and the first marking is a first preset distance; the first preset distance is matched with half of a width of the lane; and a width of the preset region is matched with the width of the lane.

The first preset distance is generally 1.5 m to 2 m, and the width of the preset region is generally 3 m to 4 m. When the recreational vehicle is in the calibrated state, that is, when the recreational vehicle is running or parked in the middle of the lane, the first marking is matched with the centerline of the lane and basically overlaps the centerline of the lane. A width of a standard lane is generally 3 m, 3.5 m, or 3.75 m. Extending 1.5 m to 2 m from the first marking to both sides can accurately locate the left and right lane lines of the lane where the recreational vehicle is located. Based on this, extending one lane width outwards can determine the lanes adjacent to both sides of the lane where the recreational vehicle is located. When the recreational vehicle is in the running state, only the information of the vehicles in the calibrated region is detected to determine whether an abnormal target vehicle exists, so that fast response is achieved, and the user is guided to perform the lane change operation.

In this embodiment, the step of in a running process of the recreational vehicle, determining whether an abnormal target vehicle exists in the calibrated region, and outputting a prompt instruction when a determining result is yes includes:

S41, determining whether a target vehicle exists in the calibrated region;

S42, when a target vehicle exists in the calibrated region, determining whether a running direction of the target vehicle is the same as a running direction of the recreational vehicle;

S43, when the running direction of the target vehicle is the same as the running direction of the recreational vehicle, comparing whether the longitudinal distance of the target vehicle relative to the recreational vehicle is less than a preset distance;

S44, when the longitudinal distance of the target vehicle relative to the recreational vehicle is less than the preset distance, determining whether the speed of the target vehicle relative to the recreational vehicle is greater than a preset relative speed;

S45, when the speed of the target vehicle relative to the recreational vehicle is greater than the preset relative speed, determining whether the longitudinal speed of the target vehicle relative to the ground is greater than a preset speed; and S46, when the longitudinal speed of the target vehicle relative to the ground is greater than the preset speed, labeling the target vehicle as an abnormal target vehicle, and outputting the prompt instruction.

Due to the above method, it is possible to effectively determine whether an abnormal target vehicle exists in the calibrated region, and the prompt information is output when an abnormal target vehicle exists in the calibrated region, so as to prompt the user that changing lanes at this time poses a risk. Specifically, when the running direction of the target vehicle existing in the calibration region is opposite to the running direction of the recreational vehicle, the target vehicle does not affect lane change of the recreational vehicle, and the lane change operation can be performed, so as to eliminate the influence of vehicles with opposite running directions. Whether the longitudinal distance of the target vehicle relative to the recreational vehicle is less than the preset distance is further compared. When the longitudinal distance of the target vehicle relative to the recreational vehicle is not less than the preset distance, the target vehicle does not affect the lane change of the recreational vehicle, and the lane change operation can be performed. When the speed of the target vehicle relative to the recreational vehicle is not greater than the preset relative speed, the target vehicle does not affect the lane change of the recreational vehicle. When the longitudinal speed of the target vehicle relative to the ground is greater than the preset speed, the target vehicle is labeled as the abnormal target vehicle, and the prompt instruction is output. When the longitudinal speed of the target vehicle relative to the ground is less than the preset speed, the target vehicle has a low speed, which does not affect the lane change of the recreational vehicle. Target vehicles with low speeds can also be eliminated to avoid triggering of an alarm in low-speed driving or in a parked state.

In this embodiment, the step of in a running process of the recreational vehicle, determining whether an abnormal target vehicle exists in the calibrated region, and outputting a prompt instruction when a determining result is yes further includes:

S47, if the calibrated region includes a first calibrated region on the left hand side of the recreational vehicle and a second calibrated region on the right hand side of the recreational vehicle, determining that an abnormal target vehicle exists in the first and/or second calibrated region, outputting a first prompt instruction when the abnormal target vehicle exists in the first calibrated region, and outputting a second prompt instruction when the abnormal target vehicle exists in the second calibrated region.

In the above method, the calibrated region is divided into the first calibrated region on the left hand side of the recreational vehicle and the second calibrated region on the right hand side of the recreational vehicle. When the abnormal target vehicle appears in the first calibrated region and/or the second calibrated region, different prompt instructions are output to enable the user to distinguish the region where the abnormal target vehicle is located and assist the user in the lane change operation.

In this embodiment, the step of outputting prompt information according to the prompt instruction includes:
if the prompt information includes first prompt information and second prompt information:
S51, when the first prompt instruction has been received, outputting the first prompt information; and
S52, when the second prompt instruction has been received, outputting the second prompt information.

In this embodiment, the first prompt information includes at least one of first sound information and first light information. The second prompt information includes at least one of second sound information and second light information. The first sound information and the second sound information are different.

By use of the above method, different pieces of prompt information are output according to different prompt instructions, which can facilitate the user to distinguish the region where the abnormal target vehicle appears. For example, when the abnormal vehicle appears in the first calibrated region on the left hand side of the recreational vehicle, the first sound information is output, such as "Bong Bong". At the same time, a first lamp located on the left hand side is lit up to output the first light information. When the abnormal vehicle appears in the second calibrated region on the right hand side of the recreational vehicle, the second sound information is output, such as "Ting Ting". At the same time, a second lamp on the right hand side is lit up to output the second light information.

Figure 15:
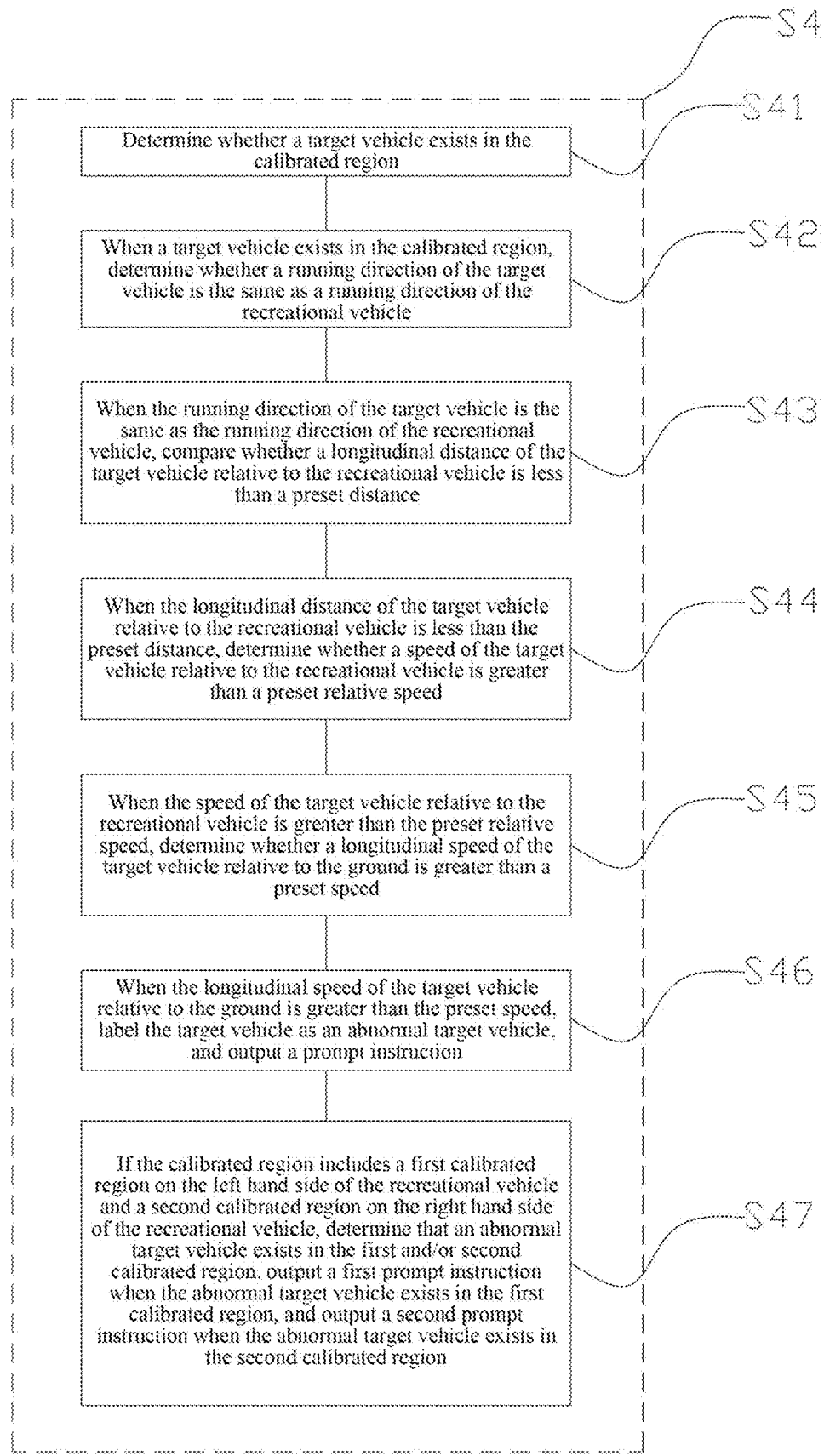
FIG. 15 is a flowchart of step 4 of the method of the present disclosure.
Figure 16:
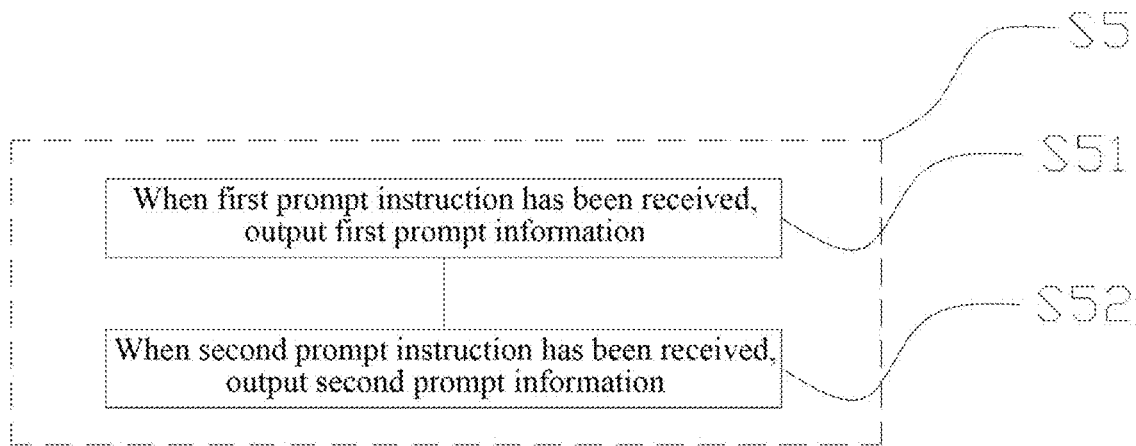
FIG. 16 is a flowchart of step 5 of the method of the present disclosure.
Figure 17:
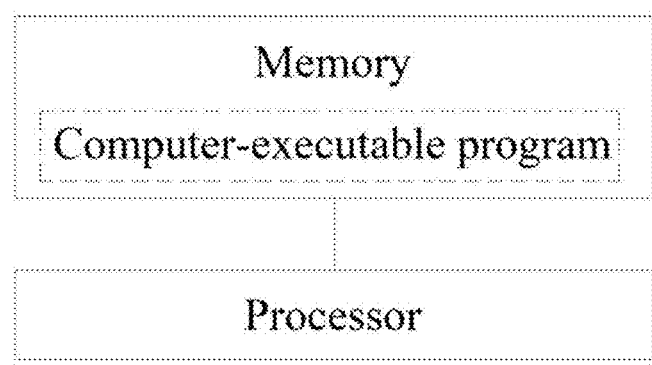
FIG. 17 is a schematic diagram of a computer storage medium of the present disclosure.

Referring to FIG. 15, the present disclosure provides a computer-readable storage medium. A specific implementation of the computer-readable storage medium of the present disclosure is roughly the same as the specific implementation of the aforementioned lane change assistance method for the recreational vehicle, and has the same technical effects, which will not be described in detail here.

It should be noted that the terms "include", "comprise", or any other variations thereof herein is intended to cover a non-exclusive inclusion, so that a processor, device, object, or method including a series of elements not only includes those elements, but also includes other elements not specifically listed, or includes inherent elements of this process, device, object, or method. Without more limitations, elements defined by the sentence "including one" does not exclude that there are still other same elements in the process, device, object, or method including these elements.

The sequential numbers of the foregoing embodiments of the present disclosure are merely for description purpose but do not imply the preference of the embodiments. According to the descriptions in the foregoing implementations, a person skilled in the art may clearly learn that the method according to the foregoing embodiment may be implemented by relying on software and an essential commodity hardware platform or by using hardware, but the former is a better implementation in most cases. Based on such an understanding, the technical solutions of the present disclosure essentially, or the part contributing to the prior art, may be presented in the form of a software product. The computer software product is stored in the aforementioned storage medium (for example, a read-only memory (ROM)/random access memory (RAM), a magnetic disk, or an optical disk) including several instructions to enable a terminal device (which may be a mobile phone, a computer, a server, a network device, or the like) to perform the methods described in all the embodiments of the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A lane change assistance system for a recreational vehicle, comprising:
    an image acquisition device, wherein the image acquisition device is configured to obtain image information around the recreational vehicle and transmit wireless signals through a wireless transmission device; and
    a display device, wherein the display device is configured to receive the wireless signals through a wireless receiving device and display the image information; a controller is arranged in the display device; and the controller is configured to analyze the image information and output prompt information when there is an abnormal vehicle in a calibrated region;
    wherein the image acquisition device comprises at least one camera; the camera is configured to be mounted on an outer wall of the recreational vehicle and is electrically connected to a circuit system inside the recreational vehicle;
    wherein a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°.

2. The lane change assistance system for the recreational vehicle according to claim 1, wherein the calibrated region comprises a first calibrated region on a left hand side of the recreational vehicle and a second calibrated region on a right hand side of the recreational vehicle; when the abnormal vehicle exists in the first calibrated region, the controller outputs first prompt information; when the abnormal vehicle exists in the second calibrated region, the controller outputs second prompt information; and the first prompt information is not the same as the second prompt information.

3. The lane change assistance system for the recreational vehicle according to claim 2, wherein the first prompt information comprises at least one of sound information, image information, and light information; and the second prompt information comprises at least one of sound information, image information, and light information.

4. The lane change assistance system for the recreational vehicle according to claim 1, wherein the calibrated region is a partial region in lanes adjacent to both sides of a lane where the recreational vehicle is located.

5. The lane change assistance system for the recreational vehicle according to claim 4, wherein the system further comprises a first calibration mode; the image information comprises lane information; and in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane.

6. The lane change assistance system for the recreational vehicle according to claim 5, wherein the system further comprises a second calibration mode; the display device allows a user to manually input calibration information; in a case that the calibration in the first calibration mode fails, the controller enters the second calibration mode; and in the second calibration mode, the controller receives the calibration information and determines the calibrated region according to the calibration information.

7. The lane change assistance system for the recreational vehicle according to claim 6, wherein the system further comprises a third calibration mode; in a case that the calibration in both the first calibration mode and the second calibration mode fails, the controller enters the third calibration mode; and the controller determines a preset region to be the calibrated region.

8. The lane change assistance system for the recreational vehicle according to claim 1, wherein the system further comprises a connector; the connector is electrically connected to the display device; and the connector is configured to be connected to a circuit output end of the recreational vehicle.

9. The lane change assistance system for the recreational vehicle according to claim 8, wherein the wireless receiving device is arranged on the connector; or, the wireless receiving device is arranged on the display device.

10. The lane change assistance system for the recreational vehicle according to claim 8, wherein the system further comprises a transformer; the transformer is arranged between the connector and the display device or the transformer is arranged in the display device; the transformer is electrically connected to the connector and the display device; and the transformer is configured to change a voltage.

11. The lane change assistance system for the recreational vehicle according to claim 4, wherein the camera comprises a mounting shell and a lens; the mounting shell is configured to be mounted on the outer wall of the recreational vehicle; and the lens is rotatably connected to the mounting shell.

12. A lane change assistance system for a recreational vehicle, comprising:
an image acquisition device, wherein the image acquisition device is configured to obtain image information around the recreational vehicle and transmit wireless signals through a wireless transmission device; and
a display device, wherein the display device is configured to receive the wireless signals through a wireless receiving device and display the image information; a controller is arranged in the display device; and the controller is configured to analyze the image information and output prompt information when there is an abnormal vehicle in a calibrated region;
wherein the system further comprises a positioning device; the positioning device is electrically connected to the controller; the positioning device is configured to obtain position information of the recreational vehicle and transmit the position information to the controller; and the controller calculates a running speed of the recreational vehicle according to the position information and stops outputting prompt information when the running speed is less than a preset speed.

13. A vehicle-mounted display device of a recreational vehicle, comprising:
a display device, wherein the display device is configured to receive and display image information acquired by an image acquisition device; a controller is arranged in the display device; and the controller is configured to analyze the image information and output prompt information when there is an abnormal vehicle in a calibrated region;
wherein the vehicle-mounted display device further comprises a positioning device; the positioning device is electrically connected to the controller; the positioning device is configured to obtain position information of the recreational vehicle and transmit the position information to the controller; and the controller calculates a running speed of the recreational vehicle according to the position information and stops outputting prompt information when the running speed is less than a preset speed.

14. The vehicle-mounted display device of the recreational vehicle according to claim 13, wherein the vehicle-mounted display device further comprises the image acquisition device and a wireless receiving device; the image acquisition device is configured to obtain image information around the recreational vehicle and transmit wireless signals through a wireless transmitting device; the wireless receiving device receives the wireless signals and outputs the image information to the display device; and a lower portion of the wireless receiving device is provided with a connector; and the connector is configured to be connected to a circuit output end of the recreational vehicle.

15. The vehicle-mounted display device of the recreational vehicle according to claim 13, wherein the calibrated region comprises a first calibrated region on a left hand side of the recreational vehicle and a second calibrated region on a right hand side of the recreational vehicle; when the abnormal vehicle exists in the first calibrated region, the controller outputs first prompt information; when the abnormal vehicle exists in the second calibrated region, the controller outputs second prompt information; the first prompt information is not the same as the second prompt information; the first prompt information comprises at least one of sound information, image information, and light information; and the second prompt information comprises at least one of sound information, image information, and light information.

16. The vehicle-mounted display device of the recreational vehicle according to claim 13, wherein the image acquisition device comprises at least one camera; the camera is configured to be mounted on an outer wall of the recreational vehicle and is electrically connected to a circuit system inside the recreational vehicle; a mounting height of the camera is 0.6 m to 1.5 m, and the camera is basically parallel to the ground and is oriented around the recreational vehicle; or, a mounting height of the camera is 2.3 m to 4 m, and the camera is tilted downwards and oriented around the recreational vehicle; and a tilt angle is 12° to 15°.

17. The vehicle-mounted display device of the recreational vehicle according to claim 13, wherein the calibrated region is a partial region in lanes adjacent to both sides of a lane where the recreational vehicle is located; the vehicle-mounted display device further comprises a first calibration mode, a second calibration mode, and a third calibration mode; the image information comprises lane information; in the first calibration mode, the controller is configured to analyze the lane information of the recreational vehicle in a calibrated state and automatically determine the calibrated region according to the lane information, wherein the calibrated state is that the recreational vehicle is running or is parked in the middle of the lane; the display device allows a user to manually input calibration information; in a case that the calibration in the first calibration mode fails, the controller enters the second calibration mode; and in the second calibration mode, the controller receives the calibration information and determines the calibrated region according to the calibration information; in a case that the calibration in both the first calibration mode and the second calibration mode fails, the controller enters the third calibration mode; and the controller determines a preset region to be the calibrated region.

* * * * *